(12) United States Patent
Rickard et al.

(10) Patent No.: US 12,464,971 B2
(45) Date of Patent: Nov. 11, 2025

(54) SOWING DEVICE AND METHOD FOR TREATING SEEDS DURING PLANTING

(71) Applicant: SYNGENTA CROP PROTECTION AG, Basel (CH)

(72) Inventors: Jamie Rickard, Oftringen (CH); Christophe Lupfer, Basel (CH); Christoph Grimm, Basel (CH)

(73) Assignee: SYNGENTA CROP PROTECTION AG, Basel (CH)

( * ) Notice: Subject to any disclaimer, the term of this patent is extended or adjusted under 35 U.S.C. 154(b) by 852 days.

(21) Appl. No.: 17/636,197

(22) PCT Filed: Aug. 14, 2020

(86) PCT No.: PCT/EP2020/072886
§ 371 (c)(1),
(2) Date: Feb. 17, 2022

(87) PCT Pub. No.: WO2021/032630
PCT Pub. Date: Feb. 25, 2021

(65) Prior Publication Data
US 2022/0279702 A1 Sep. 8, 2022

(30) Foreign Application Priority Data

Aug. 21, 2019 (EP) .................................... 19192910

(51) Int. Cl.
*A01C 1/06* (2006.01)
*A01C 7/20* (2006.01)
(52) U.S. Cl.
CPC . *A01C 1/06* (2013.01); *A01C 7/20* (2013.01)
(58) Field of Classification Search
CPC .... A01C 1/06; A01C 1/00; A01C 7/20; A01C 7/00
See application file for complete search history.

(56) References Cited

U.S. PATENT DOCUMENTS

| | | | |
|---|---|---|---|
| 6,112,679 | A | 9/2000 | Borstmayer et al. |
| 9,730,377 | B2 | 8/2017 | Kowalchuk |

(Continued)

FOREIGN PATENT DOCUMENTS

| | | |
|---|---|---|
| EP | 3195716 A1 | 7/2017 |
| WO | 2016209217 A1 | 12/2016 |

OTHER PUBLICATIONS

Written Opinion of the International Searching Authority and International Search Report for International Application No. PCT/EP2020/072886, mailed Nov. 17, 2020.

*Primary Examiner* — Christopher J. Novosad
(74) *Attorney, Agent, or Firm* — BakerHostetler

(57) ABSTRACT

A sowing device for discharging and treating discharged plant propagation materials during their fall onto an underlying agricultural surface (B), having a reservoir container (10) for the plant materials, having a separating device (20) which is configured to separate plant materials (K) fed from the reservoir container and to output them individually, and having an application device (30) to apply a compound onto the separated plant materials from a cartridge assembly comprising one or more cartridges that each are separate from the reservoir container in the sowing device, wherein the application device applies the dressing from the one or more cartridges to the separated plant materials after they leave the separating device while the separated plant materials fall freely on toward the underlying agricultural surface wherein the device and the one or more cartridges are configured to allow repeated removal from the device, and optionally, refilling with the dressing composition and replacing in the device, with minimal operator interaction.

15 Claims, 8 Drawing Sheets

(56) References Cited

U.S. PATENT DOCUMENTS

2012/0016517 A1    1/2012    Holland
2017/0265374 A1    9/2017    Wintemute et al.
2018/0255696 A1    9/2018    Wintemute et al.

SOWING DEVICE AND METHOD FOR TREATING SEEDS DURING PLANTING

CROSS-REFERENCE TO RELATED APPLICATIONS

This application is a 371 National Stage application of International Application No. PCT/EP2020/072886 filed Aug. 14, 2020, which claims the benefit of EP 19192910.8, filed Aug. 21, 2019, the entire contents of these applications are hereby incorporated by reference.

FIELD OF THE INVENTION

The present invention is directed to methods of improving plant growth by treating plant propagation materials with a novel seed treatment during the sowing process.

BACKGROUND OF THE INVENTION

Modern farming practices strive to increase yields of agricultural fields. Treated seeds are coated with substances such as fungicides, insecticides, nematicides and/or fertilizers that can improve performance of seeds based on particular agronomic characteristics of a field.

Farmers often use treated seeds, which require seed pre-treatment at a pre-treatment location, which involves intimate contact with the seeds and dust created by attrition and friction between the seeds during transport, storage, and loading, and hence may result in human exposure to the active ingredients. For this use, storage and transport stable seed dressings are typically employed, usually not comprising compounds with adverse effects cannot be used because of their longer term effect on seedling growth, i.e. when seeds are carried over. While certain pathogen or plant pest infestations may be considered in this pre-treatments, their actual occurrence often strongly depends on factors such as climate, microclimate; temperature, wind speed and directions and humidity, which are usually most relevant directly before the planting season.

In pre-treatment, usually broad-band approaches are employed, since the pre-treater cannot predict the actual requirements for the particular application, and does not permit a bespoke approach per field, or even per part of a field. This may lead to the use of various superfluous active ingredients, and/or overdosing on the seeds. On the other hand, in absence of the appropriate active ingredients, particular pest infestations may not be adequately controlled by the pre-treatment of the seeds, requiring additional application of a corresponding pesticide, or leaving the crops vulnerable to the pest in question.

Furthermore, handling treated seeds requires considerable care, and disposing of leftover treated seeds can be challenging because pre-treated seeds can be hazardous to, for example, livestock and wildlife. While small quantities of leftover pre-treated seeds can sometimes be planted on additional fields, disposing of larger quantities of pre-treated seeds usually requires incineration or the like to due to the regulatory status of the treated seeds. Accordingly, it would be beneficial if the pre-treatment process could be performed done at a timely and local basis, minimizing direct contact by humans or livestock, as well as wild animals.

SUMMARY OF THE INVENTION

Accordingly, the present invention relates to a sowing device for discharging treating and discharging treated plant materials onto an underlying agricultural surface, having a reservoir container (10) for the plant materials, having a separating device (20) which is configured to separate plant materials (K) fed from the reservoir container (10) and to output them individually, and having an application device (30) to apply a dressing comprising a substrate bearing the at least one agricultural compound onto the separated plant materials (K) from a cartridge assembly comprising one or more cartridges that each are separate from the reservoir container (10) in the sowing device, wherein the application device (30) is configured to apply the dressing from the one or more cartridges to the separated plant materials (K) after they leave the separating device (20) while the separated plant materials (K) fall freely onto toward the underlying agricultural surface (B) wherein the device and the one or more cartridges are configured to allow repeated removal from the device, and optionally, refilling with the dressing composition and replacing in the device, with minimal operator interaction.

In a second aspect, the present invention relates to a process for treating plant materials, such as plant propagation materials, whereby the volume of the seed dressing is limited to the amount needed during planting.

In another embodiment the device for delivering a dressing comprising an agricultural product includes a cartridge assembly which comprises at least one cartridge or cannister comprising the at least one agricultural compound, and a computer-readable unit having information stored therein, the dispensing assembly comprising: a) a controller unit; b) a dispensing unit in communication with the controller unit and configured for generating a fluid supply flow to the application device; and c) an interface unit in communication with the controller unit, the interface unit being configured to interface the computer-readable unit of the cartridge and to at least retrieve the information stored therein; wherein the dispensing unit is responsive to the information stored on the computer-readable unit and retrieved therefrom.

SHORT DESCRIPTION OF THE FIGURES

In the text which follows, the invention will be explained in more detail with reference to exemplary embodiments illustrated in the drawing, in which.

Figure 1:
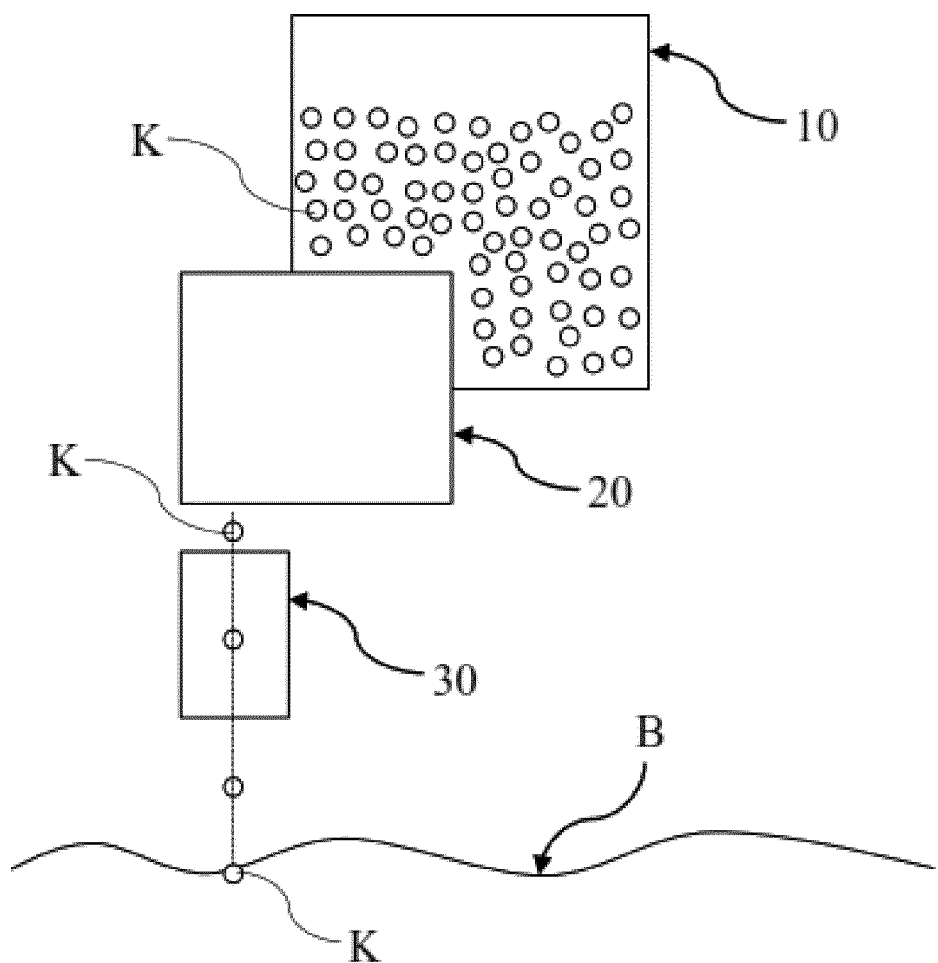
FIG. 1 shows a schematic overall illustration of the sowing device according to the invention.
Figure 2:
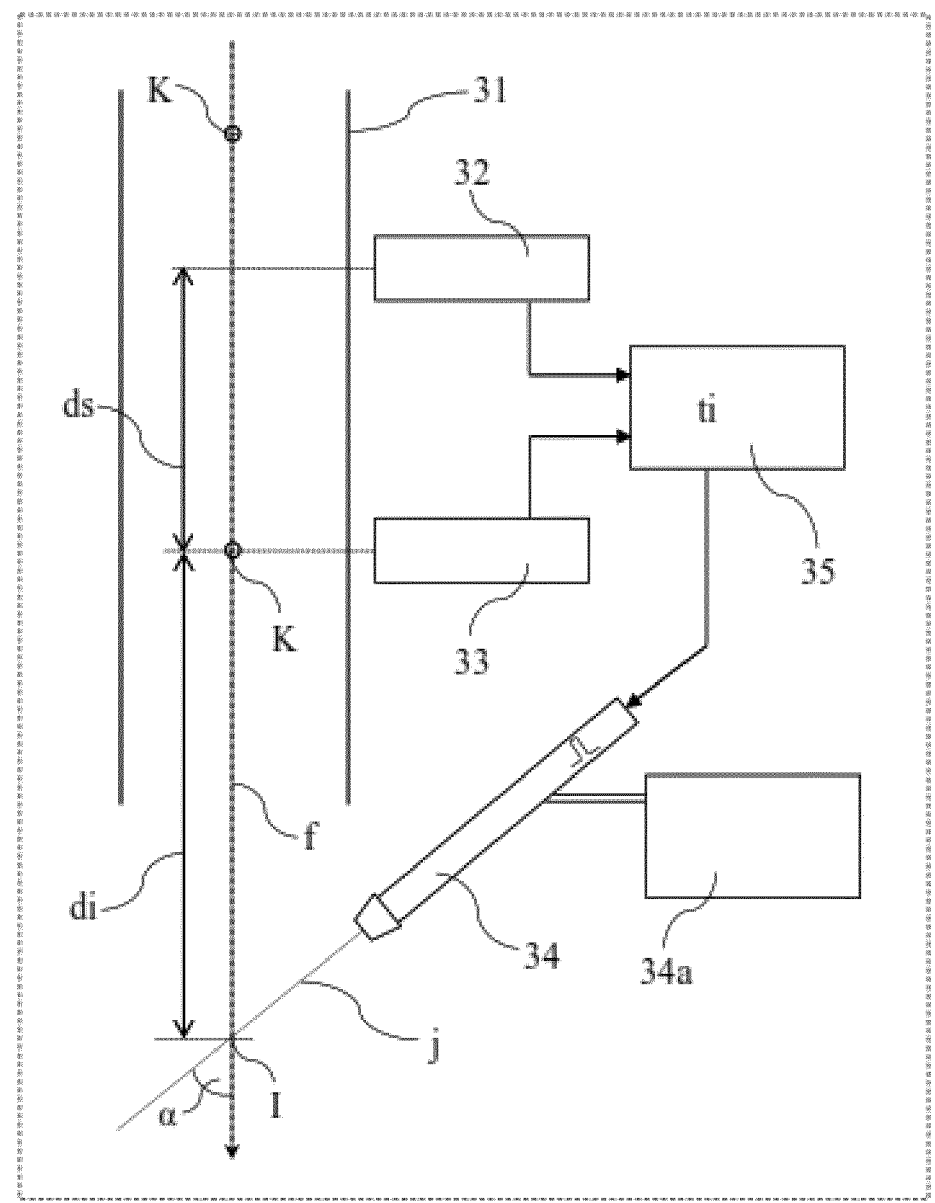
FIG. 2 shows a schematic illustration of an application device of a first exemplary embodiment of the sowing device according to the invention.
Figure 3:
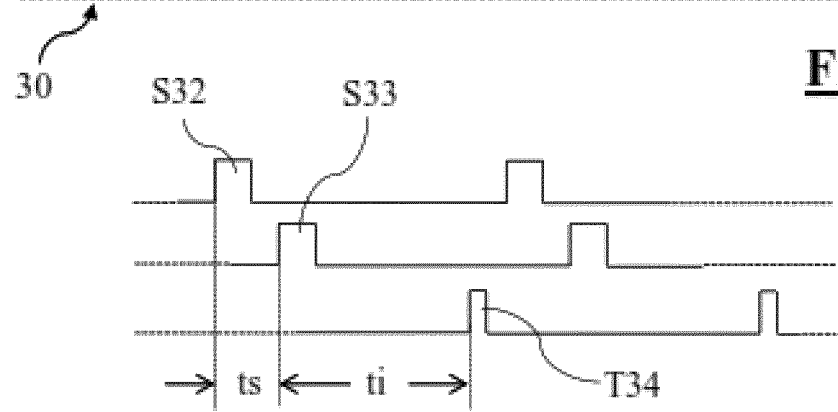
FIG. 3 shows a pulse/time diagram.
Figure 4:
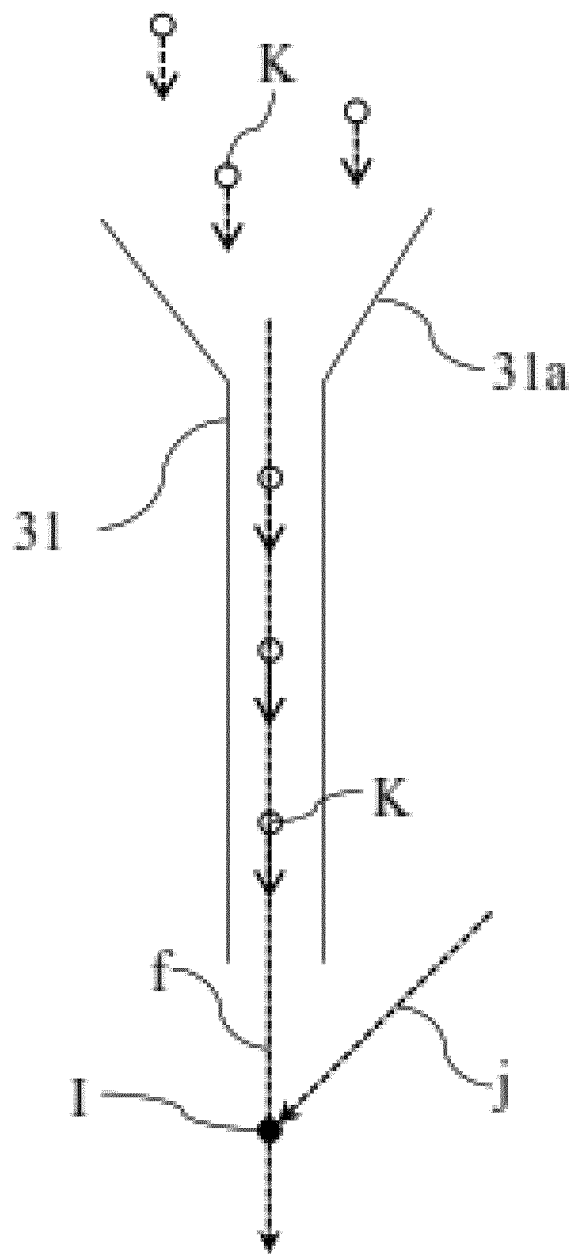
FIG. 4 shows a highly simplified schematic illustration of an application device of a second exemplary embodiment of the sowing device according to the invention.
Figure 5:
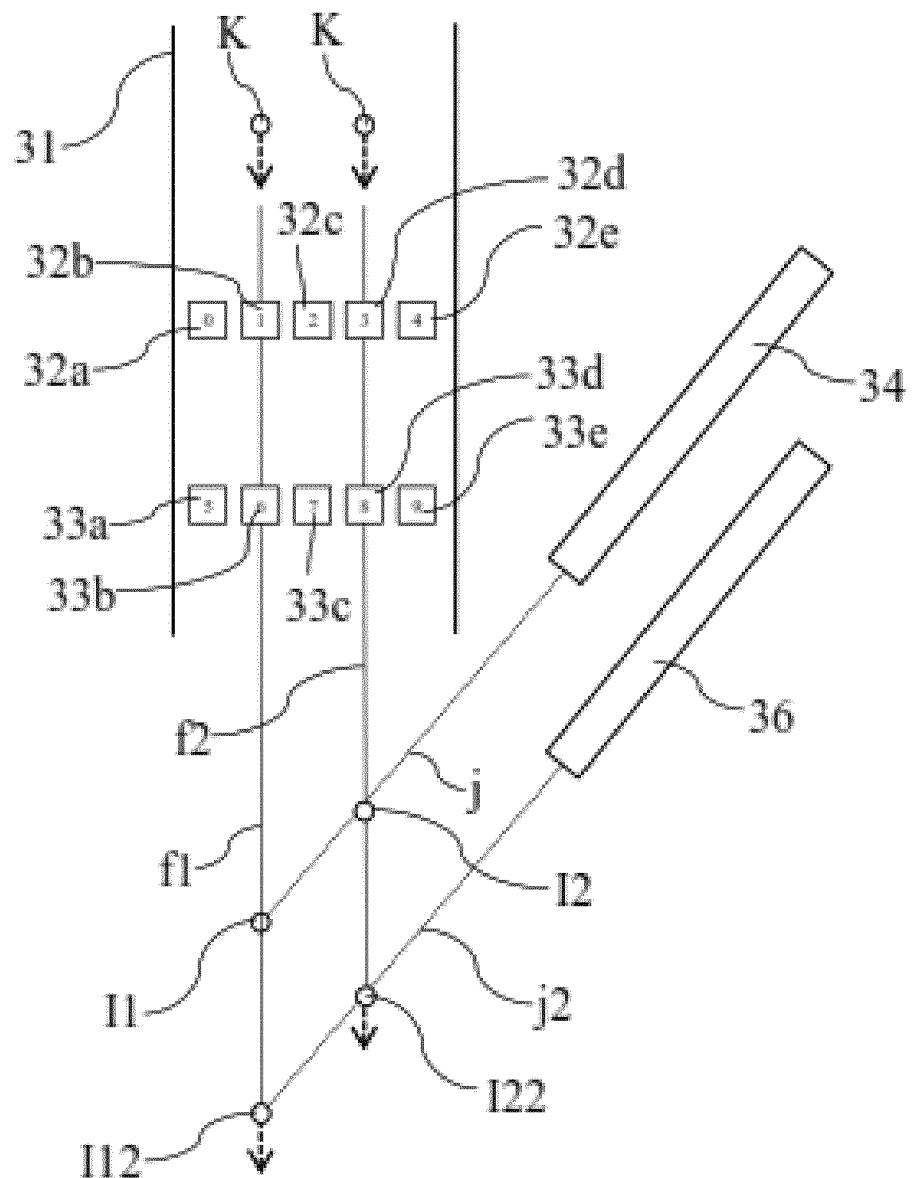
FIG. 5 shows a likewise highly simplified schematic illustration of an application device of a third exemplary embodiment of the sowing device according to the invention.
Figure 6:
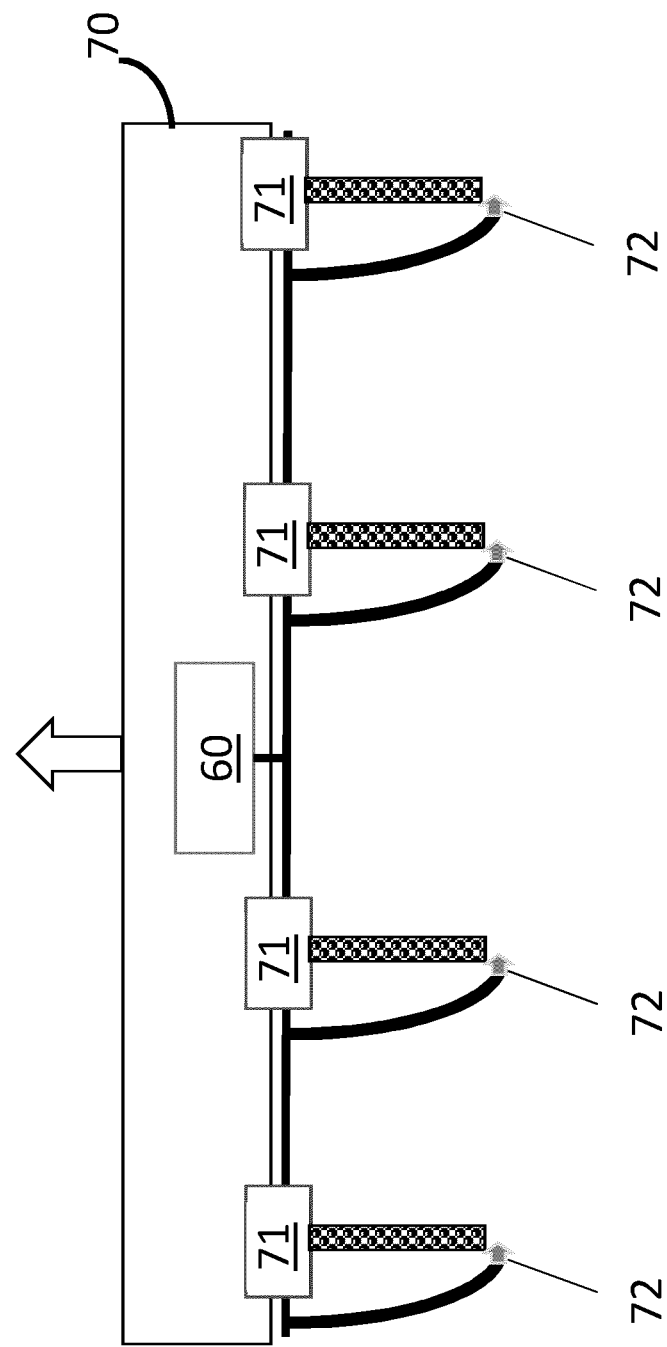

FIG. 6 shows a highly simplified schematic illustration of the sowing device according to the invention with a seed tank that contains a cartridge for holding a seed dressing and that is provided, beneath the tank, with a plurality of rows of a plurality of nozzles; the nozzles are in fluid communication with the cartridge and can apply, in an application device of the sowing device, also beneath the tank, seed dressing from the cartridge to individual plant propagation materials falling in a plurality of fall lines from the seed tank.

Figure 7:
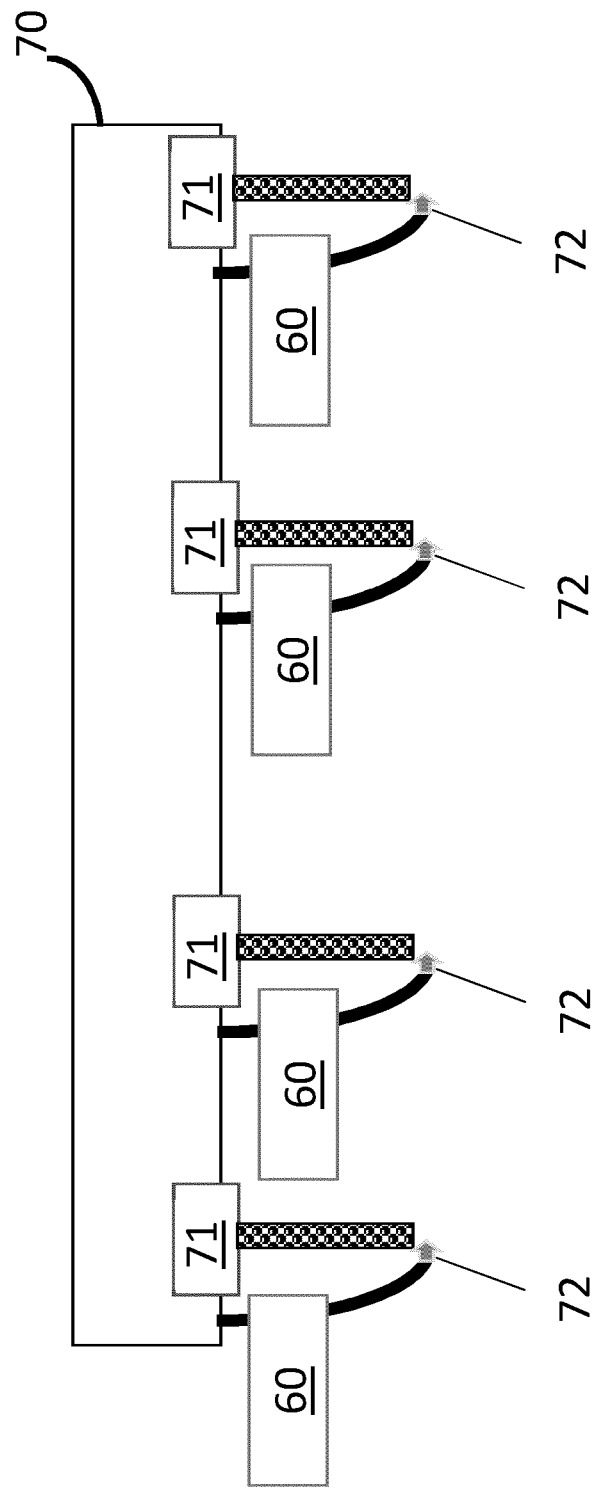

FIG. 7 shows a highly simplified schematic illustration of the sowing device according to the invention with a seed tank and, beneath it, a plurality of cartridges which contain a seed dressing and each of which is provided with a separate nozzle, beneath each cartridge; each nozzle is in fluid communication with a separate one of the cartridges and can apply, in an application device of the sowing device, also beneath the cartridges, seed dressing from the separate cartridge to individual plant propagation materials falling in a plurality of fall lines from the seed tank.

Figure 8:
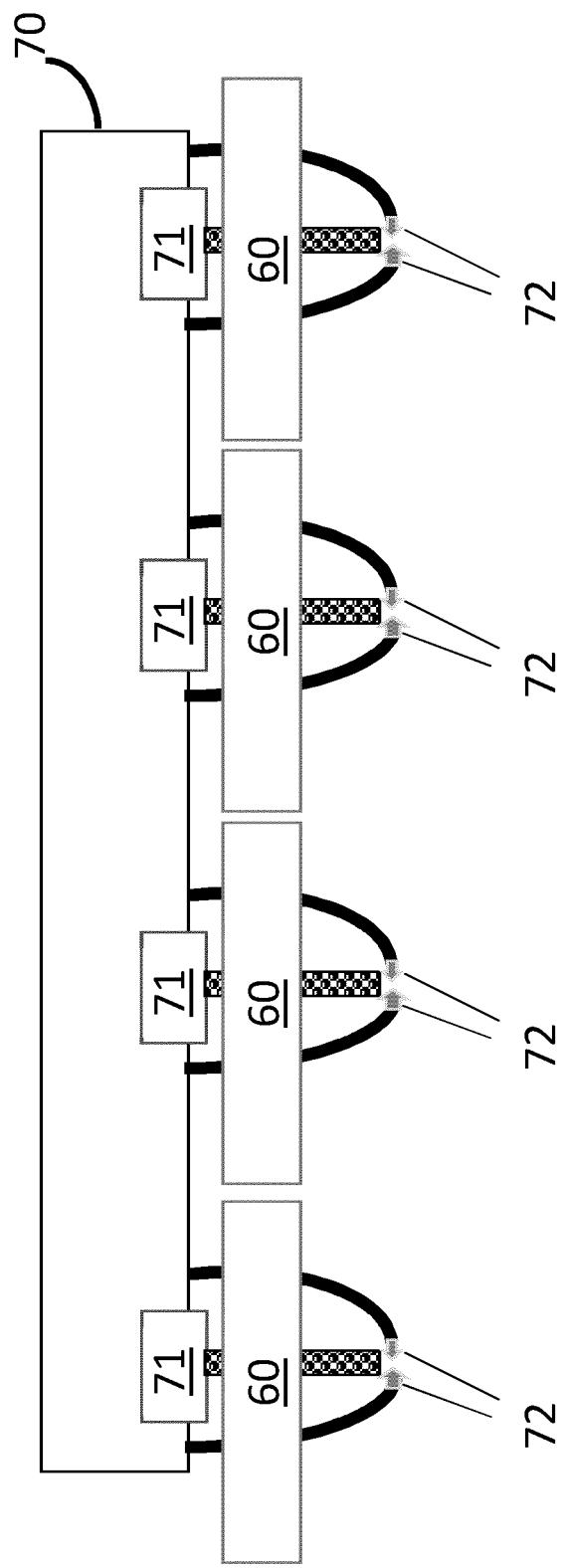

FIG. 8 shows a highly simplified schematic illustration of the sowing device according to the invention with a seed tank and, beneath it, a plurality of cartridges which contain a seed dressing and each of which is provided with a separate pair of nozzles, beneath the cartridges; each pair of nozzles is in fluid communication with a separate one of the cartridges and can apply, in an application device of the sowing device, also beneath the cartridges, seed dressing from the separate cartridge to individual plant propagation materials falling in a plurality of fall lines from the seed tank.

Figure 9:
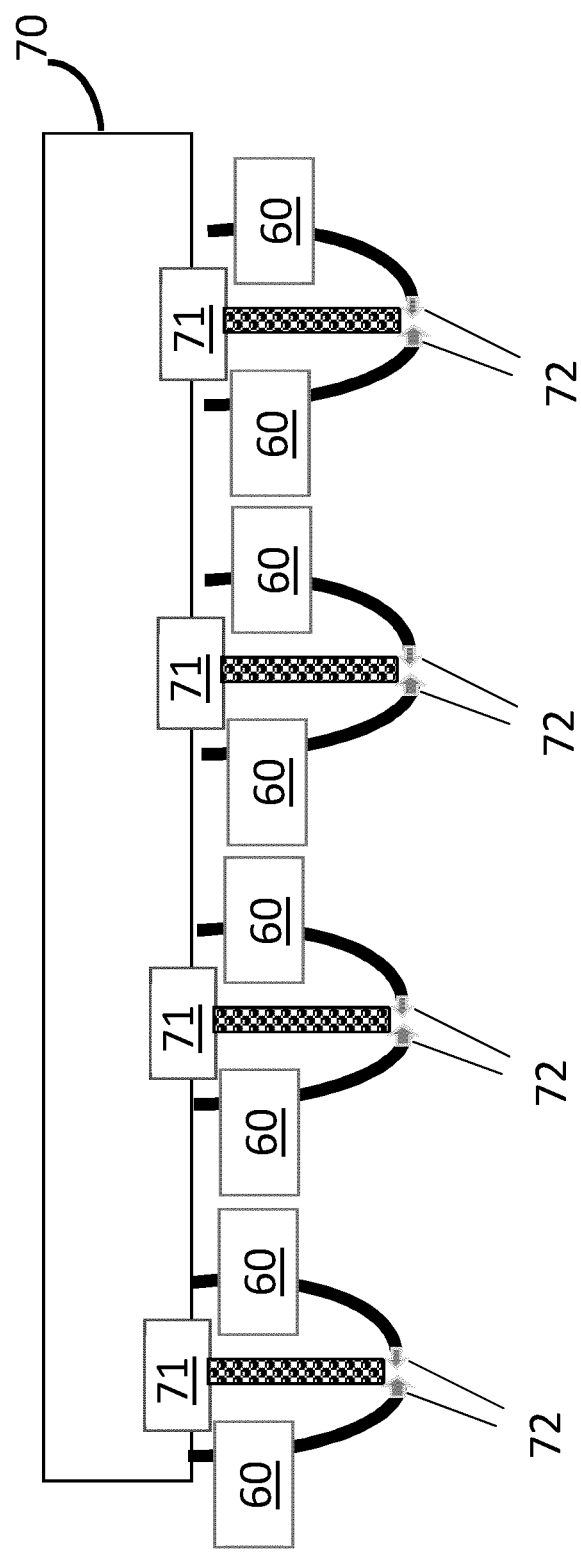

FIG. 9 shows a highly simplified schematic illustration of the sowing device according to the invention with a seed tank and, beneath it, a plurality of pairs of cartridges which contain a seed dressing and each of which is provided with a separate nozzle, beneath the cartridges; each nozzle is in fluid communication with a separate one of the cartridges, and each pair of nozzles can apply, in an application device of the sowing device, also beneath the cartridges, seed dressing from the separate cartridge to individual plant propagation materials falling in a plurality of fall lines from the seed tank.

DETAILED DESCRIPTION OF THE INVENTION

As used herein, the term seed dressing herein relates to liquid compositions useful for covering and/or wetting a seed or plant material at least in part. Such compositions comprise at least one agricultural compound, and a diluent, solvent or otherwise carrier permitting an application.

As used herein, the term "agricultural compound" herein relates to compounds known to assist the growth of crops, comprising chemical or biological substances including but not limited to micronutrients, insecticides, for protecting against sucking and eating insects; fungicides for protecting against fungal pathogens; inoculants, antibacterials, herbicides; safeners; immune-response-triggering compounds; biologicals, biosimilars, gene modulating seed dressings; growth regulators; and crop enhancers that offer specific, chemically induced, physiological responses of plants that increase and/or improve yields, in particular under abiotic stress; as well as solvents, carriers, emulsifiers, viscosity modifiers, stabilizers, encapsulants and/or any colorants, and any combinations thereof.

As used herein, the term "herbicide," means and includes an active material that kills, controls, or otherwise adversely affects the growth of plants.

As used herein, the term "insecticide," means and includes an active material that kills, regulates, or otherwise adversely affects the growth of insects.

Exemplary bactericides include chlortetracycline, oxytetracycline, streptomycin.

As used herein, the term "pesticide," means and includes an active material that kills, regulates, or otherwise adversely affects the growth of pests (e.g., insects, mites, ticks, nematodes, bacteria, fungi, diseases, and plants). As used herein, the term "fungicide," means and includes an active material that kills, controls, or otherwise adversely affects the growth of fungi or fungal spores.

Where used, references in brackets behind the active ingredients, e.g. [3878-19-1] refer to the Chemical Abstracts Registry number. The above described mixing partners are known. Where the active ingredients are included in "The Pesticide Manual", The Pesticide Manual—A World Compendium; Thirteenth Edition; Editor: C. D. S. TomLin; The British Crop Protection Council, they are described therein under the entry number given in round brackets hereinabove for the particular compound; for example, the compound "abamectin" is described under entry number (1). Where "[CCN]" is added hereinabove to the particular compound, the compound in question is included in the "Compendium of Pesticide Common Names", which is accessible on the internet, see A. Wood; Compendium of Pesticide Common Names, Copyright © 1995-2004.

Most of the active ingredients described below are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "development code" is used or, if neither one of those designations nor a "common name" is used, an "alternative name" is employed. "CAS Reg. No" means the Chemical Abstracts Registry Number.

In respect of the sowing method, the essence of the invention consists in the following: in a sowing method for discharging plant material (herein also referred to as seeds) onto an underlying surface for seeding or planting, plant materials which are present in a reservoir container are removed from the reservoir container and separated. Seed dressing is applied to the separated plant propagation materials, and the individual plant propagation materials to which seed dressing has been applied are successively delivered onto the underlying surface for seed. The application of seed dressing to the separated plant materials takes place here during their falling movement onto the underlying surface for seed. The plant propagation materials may fall onto the underlying surface along a straight or curved fall line. For example, if the plant propagation materials have a velocity component substantially parallel to the underlying surface, for example due to horizontal movement of the sowing device as it traverses the underlying surface, as well as a downward acceleration component due to gravity, then the fall line may be substantially parabolic in a frame of reference where the underlying surface is stationary, while the fall line may be substantially straight in a frame of reference where the sowing device is stationary.

Applying seed dressing to the plant propagation materials, as it were, in free fall prevents contamination of the components of the corresponding sowing device. In particular, seed dressing is not applied to the plant propagation materials while they rest on a surface or while they are held in a container or reservoir or other device. In this way, it is possible to apply seed dressing to the plant propagation materials without at the same time contaminating parts of the sowing device with the seed dressing, as in the prior art.

Yet further, due to the fact that each aliquot is directed towards a single plant propagation material, by combining environmental data and/or geolocation data, the operator may vary the composition and/or concentration of the applied dressing during a single application or sowing run.

This has the benefit that only where necessary, certain active compounds are used, and also specifically for a certain seed or seed patch. An example may be crop fields were different climate conditions apply, e.g. higher soil humidity towards a water source, which may lead to a certain pest to likely originate from this spot; by adapting the concentration or even presence of a certain compound, this may be treated only where necessary. Also, where certain areas are more arid or subject to a certain stress, additional growth enhancer might be added for this area or patch, resulting in a more uniform overall growth, and hence increased harvest. Yet further, the present invention also allows for the use of dedicated removable cartridges or cannisters, which may reduce the operator exposure significantly. Also, this may advantageously permit applying the principles of digital printing to the process of planting and/or sowing, thereby allowing for an adaption to the terrain and current and modelled conditions. Yet further, the present device and method also permit the use of relatively storage unstable components, such as biologicals or biosimilar compounds, which were previously unsuited for pre-treatment of plant propagation materials, and the treatment of storage unstable plant propagation materials such as cuttings or seedlings.

After the plant propagation materials have been separated they may be allowed to fall through a sensor shaft, wherein the passage of each separated seed through the sensor shaft is detected by sensor and a time delay until the seed arrives at an impact location, located along the fall line of said seed, outside the sensor shaft is calculated, and wherein the application of seed dressing to the seed takes place at the impact location in accordance with the calculated time delay. In this way, precise application of seed dressing to the plant propagation materials can be achieved.

In this context, a triggerable application nozzle is advantageously used to apply seed dressing to the plant propagation materials, which application nozzle ejects, each time it is triggered, a defined quantity of seed dressing along an spraying trajectory, wherein the impact location is defined as an intersection point between the fall line of a seed and the spraying trajectory of the application nozzle. The spraying trajectory may be essentially linear. The application nozzle is connected to a source of seed dressing. The seed dressing is advantageously in fluid form, for example in liquid, gel or droplet form. It is conceivable that a seed dressing in the form of an adhesive powder could be used. The defined quantity of seed dressing may be from 0.05 to 50 µl, preferably 0.1 to 15 µl, optionally from 0.3 to 10 µl, optionally from 1 to 5 µl, optionally from 2 to 4 µl, optionally of from 2.5 to 3.5 µl. However, it will be appreciated that different quantities of seed dressing may be appropriate for differently-sized plant propagation materials. The actual colume may be determined according to the seed size, the amount needed for flowing an application, viscosity of the dressing composition, or any other required parameter, and may be advantageously varied by e.g. changing the settings of the system, but also changing nozzles and or other parts of the system such as pumps or valves.

The seed dressing may be supplied to the application nozzle by way of a controllable valve, for example a solenoid valve or a pneumatically- or hydraulically-driven valve. By appropriate control of the valve, it is possible to control a volume of seed dressing delivered each time the application nozzle is triggered. The delivered volume may be varied as required, for example for different seed positions or different seed dressings or different seed types. Moreover, in some embodiments a pressure of the seed dressing supplied to the application nozzle may be controlled, for example by way of the pump, so as to control or adjust a velocity of the sprayed seed dressing. Differently sized and shaped nozzles, pumps and pressures may advantageously be employed for different volumes and/or composition dressing properties and application speeds.

The transverse position of each seed within the sensor shaft is advantageously detected by at least one sensor. The impact location may be defined individually on the basis of the transverse position, and accordingly the time delay until the seed arrives at the impact location can be calculated individually. In this way, a sensor shaft with a relatively wide cross section can be used, with the result that the falling movements of the plant propagation materials are not impeded.

The application nozzle is advantageously oriented in such a way that its spraying trajectory intersects the fall lines of the plant propagation materials at an acute angle of preferably 30°-60°. As a result seed dressing can be reliably applied to plant propagation materials moving on various fall lines. In some embodiments, the intersection between the spraying trajectory and a fall line may be up to 5 cm, or up to 10 cm, from the application nozzle. It is generally preferred for the distance between the application nozzle and the intersection to be short, since this helps to improve the application accuracy of the seed dressing.

Two or more seed dressings are advantageously applied to the separated plant propagation materials by means of two or more application nozzles. As a result it is possible to treat the plant propagation materials with various or different seed dressings.

With respect to the sowing device, the essence of the invention is as follows: a sowing device for discharging plant material onto an underlying surface for seed has a reservoir container for the plant material, a separating device which is designed to separate plant propagation materials fed from the reservoir container and to output them individually, and an application device to apply seed dressing to the separated plant propagation materials. The application device is configured to apply seed dressing to the separated plant propagation materials after they leave the separating device during their falling movement onto the underlying surface for seed.

Applying seed dressing to the plant propagation materials, as it were, in free fall prevents contamination of the components of the sowing device.

The application device is advantageously embodied as a structurally independent unit and is arranged underneath the separating device in the falling path of the separated plant propagation materials. As a result, the application device can be used on various sowing devices.

The application device advantageously has a sensor shaft which is open at both ends, and the application device is arranged in such a way that the separated plant propagation materials fall through the sensor shaft on their path from the separating device to the underlying surface for seed. This permits the falling plant propagation materials to be decoupled from external influences. For example, plant propagation materials falling within the sensor shaft may be protected from crosswinds or from rain.

At least one sensor for detecting the passage of a seed through the sensor shaft is advantageously arranged on an interior surface of the sensor shaft. The application device may have an application nozzle for the seed dressing, which application nozzle may be configured to apply a defined quantity of seed dressing to a seed which has fallen through the sensor shaft, once the seed is outside the sensor shaft, wherein the application device has a controller which cooperates with the at least one sensor, and which controller brings about the triggering of the application nozzle in accordance with sensor signals generated by the at least one sensor, in order to apply seed dressing to the seed. In this way, precise application of seed dressing to the plant propagation materials is possible.

The sensor may be an optical sensor, for example a CMOS or CCD-type sensor. In some embodiments, the sensor may be an optical sensor provided on one side of the sensor shaft in combination with a light source on the other side of the sensor shaft, thus forming an optical gate to detect when a seed passes between the light source and the optical sensor. In some embodiments, the sensor detects light reflected from a falling seed onto the sensor, for example by detecting a colour change or a change in light intensity.

In some embodiments, at least two sensors for detecting the passage of a seed through the sensor shaft may be arranged one after the other on an interior surface of the sensor shaft, in the falling direction of the plant propagation materials. As a seed falls, it may trigger a first sensor and subsequently a second sensor, thus allowing a rate of fall of the seed to be calculated by the controller. The controller can then calculate, on the basis of the sensor signals of the at least two sensors, a time delay after which it brings about the triggering of the application nozzle so as to target the seed correctly with the seed dressing. In this way, the rate of fall of the plant propagation materials can be taken into account during control of the application of seed dressing to the seed.

In some embodiments, at least one array of sensors may be provided on an interior surface of the sensor shaft. The at least one array may be a one-dimensional array, for example a linear array. The at least one array may be a two-dimensional array. By providing an array of sensors, it is possible to determine a lateral position of a seed within the sensor shaft with reference to a lateral dimension of the array.

The application nozzle is advantageously designed to eject, each time it is triggered, a defined quantity of seed dressing. The seed dressing may be ejected along a spraying trajectory. The spraying trajectory may be essentially linear. The controller may calculate the position of an impact location at which the spraying trajectory and the fall line of the seed to which seed dressing is applied intersect. The controller may calculate the time delay on the basis of the position of the impact location and of the rate of fall of the seed.

The application nozzle may be configured to eject a spray or droplets of seed dressing along the spraying trajectory towards the seed. The spray or droplets may cover the entire surface of the seed, or may cover only part of the surface of the seed. In particular, droplet-shaped application is to be understood as meaning here an application of seed dressing which does not completely surround the seed but rather covers only a relatively small ("punctiform") or relatively large part of the surface of the seed. The seed dressing may be configured such that it adheres as droplets to the seed. In some embodiments, the seed dressing may be chosen to dry relatively quickly and without loss of adhesion to the surface of the seed. In some embodiments, the seed dressing may be chosen so as not to dry before the seed reaches the underlying surface.

The application nozzle may comprise or be made of a corundum material, such as sapphire or ruby. In some embodiments, the application nozzle may comprise or be made of a ceramic material or a hard alloy material. It is preferred that the application nozzle is made of a hard material that is resistant to wear, abrasion and/or erosion. Abrasive particles in the seed dressing can cause unacceptable erosion of nozzles made of conventional softer metal materials.

The application nozzle is advantageously oriented in such a way that its spraying trajectory intersects the fall lines of the plant propagation materials at an acute angle of preferably 30°-60°. As a result, seed dressing can be reliably applied to plant propagation materials which are moving on various fall lines. It will be appreciated that a seed falling from the sensor shaft at a location close to the application nozzle will intersect the spraying trajectory before a seed falling from the sensor shaft at a location remote from the application nozzle. This is because the spraying trajectory is angled downwardly with respect to a horizontal direction across the sensor shaft. Accordingly, when the at least one sensor detects that a seed is falling on a fall line remote from the application nozzle, a time delay needs to be applied when activating the application nozzle so as to compensate for the additional time needed for the seed to reach the intersection between the fall line and the spraying trajectory. Account also needs to be taken of the additional time needed for the spray to reach the seed falling on the fall line remote from the application nozzle.

In some embodiments, a plurality of sensors, which detect the transverse position of the plant propagation materials within the sensor shaft, are advantageously arranged on the sensor shaft, wherein the controller calculates individually the time delay for each seed taking into account the transverse position of the seed. In this way, a sensor shaft with a relatively wide cross section can be used, with the result that the falling movements of the plant propagation materials are not impeded.

The application device advantageously has two or more application nozzles, by means of which two or more seed dressings can be applied to the separated plant propagation materials. In this way, the one or more seed dressings can be applied to the plant propagation materials by means of the same application device, depending on requirements.

In some embodiments, at least one additional sensor may be provided to detect whether or not a particular seed has actually been hit by the spray from the application nozzle. The additional sensor may be an optical sensor, for example a CMOS- or CCD-type sensor. The at least one additional sensor may detect a change in light reflected from the seed due to application of the spray. This may be a change in reflectance or, where the seed dressing has a particular colour (for example, imparted by a dye additive), the additional sensor may detect a colour change in reflected light. Data may be collected giving information as to a proportion of plant propagation materials that have been correctly provided with seed dressing by the applicator nozzle. In some embodiments, feedback control may be provided so as to vary one or more spray parameters, for example one or more of a spray pressure, spray trajectory, spray volume, seed dressing temperature and/or seed dressing viscosity, in response to detecting that an insufficient proportion of plant propagation materials have been correctly provided with seed dressing by the applicator nozzle.

In some embodiments, the sensor shaft may be omitted. Instead of falling down a sensor shaft as described above, plant propagation materials may be dispensed from the reservoir container directly to the underlying surface. Alternatively, the plant propagation materials may be extracted from reservoir container by mechanical or other means, for example a conveyor or a brush belt, before being allowed to fall freely to the underlying surface. In these embodiments, the at least one sensor is positioned and the reservoir container configured such that the plant propagation materials fall from the reservoir container along fall lines that traverse or pass the at least one sensor, allowing falling plant propagation materials to be detected as described above. The at least one application nozzle applies seed dressing to individual plant propagation materials as they fall freely from the reservoir container, and the at least one application nozzle is activated and controlled on the basis on signals from the at least one sensor. As before, an important advantage is that the seed dressing is directed towards the plant propagation materials while in free fall, thereby reducing contamination of fixed or other machinery surfaces with seed dressing.

In some embodiments, geolocation data may be collected while the plant propagation materials are being sown, thus enabling a map to be generated of the underlying surface (for example, a field) including data relating to spray parameters and/or composition of the seed dressing. Geolocation data may be collected by way of a global navigation satellite system such as GPS, GLONASS, Galileo or similar.

The controller may include a computer-readable storage medium comprising instructions which, when executed by a computer, cause the computer to carry out various of the steps described above. In particular, but not exclusively, the controller may be programmed to perform one or more of: processing signals from the at least one sensor, triggering the application device, calculating the delay time, calculating the rate of fall of a seed, determining a position of a seed, determining whether or not a seed has been correctly applied with seed dressing, determining geolocation data, and adjusting parameters of the application of seed dressing from the application device.

The application device of the sowing device according to the invention can be used on sowing devices of various types. For this reason, independent protection is also claimed for an application device which is designed to apply seed dressing to separated plant propagation materials during a falling movement of the plant propagation materials.

In the present invention, the cartridge assembly advantageously comprises at least one cartridge or cannister comprising the at least one agricultural compound, and a computer-readable unit having information stored therein, the dispensing assembly comprising:

a) a controller unit; b) a dispensing unit in communication with the controller unit and configured for generating a fluid supply flow to the application device; c) an interface unit in communication with the controller unit, the interface unit being configured to interface the computer-readable unit of the cartridge and to at least retrieve the information stored therein; wherein the dispensing unit is responsive to the information stored on the computer-readable unit and retrieved therefrom. Preferably, the controller unit and the interface unit are integral. The controller unit advantageously is configured to retrieve and to write information from and onto the computer-readable unit via the interface unit. The interface unit preferably comprises a connector or a radio-frequency transceiver, which permits control of filling levels and of application speeds and dressing composition, as well as minimizing downtime needed to refill the sowing device.

Preferably, the controller unit is also configured to control the fluid supply unit based on the information stored on the computer-readable unit and retrieved therefrom, advantageously by modulating the volume and pressure of the fluid supply unit based on the information stored on the computer-readable unit and retrieved therefrom.

The one or more cartridges are configured and constructed to permit repeated removal from the device, and then either refilled with the dressing composition and then placed back into the device, preferably, or replaced by pre-filled cartridges.

Advantageously, the one or more cartridges are each connected to a nozzle from a plurality of nozzles, through which the dressing can be applied from the cartridge to the plant materials.

Advantageously, the device may contain a plurality of the cartridges that each comprise a dressing composition, or at least one agricultural component, which may be identical or different.

The device may preferably further comprise a diluent reservoir for holding and supplying a diluent composition, and a diluent control unit for controlling the supply of the diluent composition during application. This diluent supply unit is ideally configured to supply diluent to flush the supply lines, and/or for diluting and/or transporting the agricultural compound to the application device (30).

Preferably, the device comprises at least two cartridge connector units to detachably attach the cartridges to the device, wherein each cartridge comprises a reservoir configured to hold at least an agricultural compounds. Herein, a first compound may for instance be one of a herbicide, a pesticide, and a fungicide, the second compound being one of the same, or of a different herbicide, a different pesticide and a different fungicide; and the device further preferably comprises a mixing controller unit configured to compose a seed dressing from the at least first and at least second cartridge and the diluent composition. Preferably, the device also comprises a processor configured to identify the plant material and at least one additional environmental parameter, and configured to controllably regulate the amount of the diluent, first chemical and/or second compound to be respectively provided to the fluid supply lines, and controlling the supply to the formed composition to application device.

Environmental conditions may include one or more agricultural management parameters for planting and growing crops is suited for promoting plant growth. This data may advantageously be collected from sensors on the device, or from other devices equipped with sensors and location-determining receivers. The environmental data may be associated with a field for growing a crop in a particular location, or with a particular crop type. The device further preferably comprises a transmitter configured to transmit at least the seed and the at least one additional data to a remote computer for data analysis, wherein the transmitter is configured to transmit an order request to the remote computer for the remote computer to prepare and procure another cartridge with suitable agricultural compounds to selectively compose a seed treatment. The location-determining receiver preferably then facilitates referencing measurement locations to the particular location, and a transmitter then preferably transmits the collected environmental data to a data processing system. This data processing system may then apply the collected environmental data to an agronomic model for estimating one or more agricultural management parameters, e.g. need for certain active ingredients due to predictions of emergence of a certain pest, and adjust the seed dressing to be applied accordingly. Also, the system may then require the operator, or a remote computer system, to prepare and dispatch another cartridge or cartridges with a dressing or at least one agricultural compound that may be needed for the treatment of a specific location. This permits to apply an in-0time management for the delivery of agricultural compounds with minimal downtime for the sowing apparatus. The data may be transmitted using an automatic wireless transmission but also a manually initiated transmission, or a physical wired connection may be applied, wherein the another cartridge is delivered to an address corresponding to a location of the device.

Cartridges for use with the present invention may comprise a complete formulated seed dressing compositions, including one or more agricultural compounds, diluents and adjuvants, or may comprise concentrates.

In the latter case, accurately proportioned aliquots of the desired seed dressing may be prepared by metering a diluent flow to the a concentrate flow, static mixers such as Venturi systems, and flow through devices which typically channel a flow of fluid streams through a reservoir that holds a soluble product or concentrate, releasing the product into the stream.

This may be done by conventional metering pumps in the fluid supply system, which either may inject a predetermined amount of the concentrate into the fluid supply stream while adjusting to changes in flow volume in the stream, or they may be controlled electronically by flow sensors located in the fluid stream. Preferably, such components are chosen that they are essentially inert to wear and mechanical failure.

Using concentrates, the present invention may also provide for convenient packaging for handling and shipping, since the cartridges may be made smaller and lighter than presently used reservoir containers, thereby offering the potential to reduce manufacturing and shipping costs are therefore reduced. Furthermore, there is less volume of agricultural product required, resulting in reduced storage and handling requirements.

In some embodiments the cartridges comprising the agricultural product may be rigid. In some embodiments the agricultural product containers may be disposable.

It is thus an objective of the present invention to provide a device for dispensing selectively agricultural compounds, in which removable cartridges can be removed before being fully depleted and then reused later, the cartridges generally keeping track of the remaining dispensing volume.

Hence, a device for dispensing agricultural compounds, in accordance with the principles of the present invention, generally comprises a housing having therein a main dispensing unit in fluid connection with a fluid flow control unit capable of producing fluid flow between the dispensing unit and an application device, and a controller unit operatively connected to the fluid flow unit. The device also comprises a removable cartridge which can be received in the dispensing unit fluidly closed and tamper proof manner, to minimize operator and general environmental exposure.

According to an aspect of the present invention, each cartridge may advantageously comprise a computer-readable unit, itself generally comprising at least an electronic data storage unit and an interface unit. The data storage unit has stored therein information such as, but not limited to, the serial number of the cartridge, the type of agricultural compound contained in the cartridge, the recommended dispensing cycle, the estimated remaining dispensing time or volume of the agricultural compound.

Correspondingly, the dispensing unit of the device generally comprises an interface unit operatively connected to the controller unit, or substantially integral therewith, which is configured to communicate with and read the information from the data storage unit of the computer-readable unit of the cartridge inserted in the device and to transmit the information to the controller unit. The interface unit of the dispensing unit is also preferably configured for writing updated and/or new information on the data storage unit of the computer-readable unit of the cartridge.

According to another aspect of the present invention, the controller unit is responsive to the information read from the computer-readable unit of the cartridge. In that sense, the controller unit can perform different functions depending on the information read. For example, upon being informed of the desired dispensing cycle, the controller unit can drive the fluid supply unit according to a specific sequence and/or according to a specific speed.

In another example, upon being informed of the estimated remaining dispensing volume or time, the controller unit could turn on and/or flash a warning indicator to indicate that the remaining dispensing volume is below a certain threshold and that the cartridge should be replaced.

In still another example, upon being informed of the type of agricultural compound stored in the cartridge, the controller unit could modulate the fluid supply speed to take into account the volume of the compound.

The computer-readable unit of the cartridge could be interfaced by the interface unit of the dispensing unit wirelessly (e.g. via radio-frequency transceivers) or through a physical connection (e.g. via connectors).

Though many kinds of known substrates could be used in the cartridges, those that allow for either easy cleaning and refill, or disposal in terms of incineration are preferred.

Hence, a device for dispensing dressings comprising agricultural compounds, in accordance with the principles of the present invention, generally comprises a main dispensing unit capable of receiving removable cartridges. The dispensing unit generally comprises a controller unit and a fluid supply unit in communication with the controller unit.

Each of the cartridges generally comprises a casing having therein a substrate bearing the one or more agricultural compound(s) and any diluents or solvents or otherwise carrier fluids to be dispensed, and a computer-readable unit capable of being interfaced by the controller unit of the dispensing unit. Advantageously, the device also comprises a fluid circuit for flushing or recycling diluent and seed dressing composition, to a waste reservoir. Yet further, the present apparatus and device also preferably includes suitable fluid loops for flushing, purging and cleaning the fluid system. Preferably, the system also comprises a waste reservoir, more preferably in the shape of a waste cartridge or cannister which may allow to flush and purge the system completely with a cleaning diluent or solvent, thereby avoiding operator exposure entirely, and allowing to return unused components to a suitable waste disposal process. Switching between the various cycles or recycles may advantageously be performed using automated two-or three-way valves.

The one or more cartridges may be preferably configured to be detachably attached to the device according the invention in a tamper-proof manner, and comprise a reservoir configured to hold at least a first agricultural compound. Preferably, the cartridge further comprises a controllable conduit operatively connected to the reservoir of the cartridge; and a cartridge controller that controllably regulates the dispensing of the a first agricultural compound to conduit when the cartridge is in fluid connection, and controls the dispensing of the a first agricultural compound into the fluid supply system and interacts with the device controller unit.

In accordance with the principles of the present invention, the controller unit may controllably drive the fluid supply unit based on information retrieved from the computer-readable unit of the cartridge received in the dispensing unit. Also in accordance with the principles of the present invention, the controller unit can warn the operator, through different signalling or warning schemes that a cartridge is almost depleted, or calculate the time until a cartridge needs replacement.

Accordingly, the present invention also relates to a sowing and seed treatment system comprising: a. a remote facility including a remote computer, and b. a filling station located at a remote location; and c. a shipping centre configured to package and ship the another cartridge to a predetermined address, and d. a device according to the invention.

By providing the ability to the cartridges and to the controller unit to communicate with each the other, and by providing the cartridges with memory, the present invention provides significant benefits such as, but not limited to, allowing the controller unit of the dispensing device to drive the supply unit according to a sequence and/or a speed which actually depend on the cartridge used in the device, and allowing the user to remove a used yet non-depleted cartridge and then reuse it later. In an embodiment of the present invention, the cartridge and the nozzle may be executed integrally.

Where used, references in brackets behind the active ingredients, e.g. [3878-19-1] refer to the Chemical Abstracts Registry number. The above described mixing partners are known. Where the active ingredients are included in "The Pesticide Manual", The Pesticide Manual—A World Compendium; Thirteenth Edition; Editor: C. D. S. TomLin; The British Crop Protection Council, they are described therein under the entry number given in round brackets hereinabove for the particular compound; for example, the compound "abamectin" is described under entry number (1). Where "[CCN]" is added hereinabove to the particular compound, the compound in question is included in the "Compendium of Pesticide Common Names", which is accessible on the internet, see A. Wood; Compendium of Pesticide Common Names, Copyright © 1995-2004.

Most of the active ingredients described below are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "development code" is used or, if neither one of those designations nor a "common name" is used, an "alternative name" is employed. "CAS Reg. No" means the Chemical Abstracts Registry Number.

As used herein, the term "dressing composition" herein relates to liquid compositions useful for covering and/or wetting a seed or plant material at least in part. Such compositions comprise at least one agricultural compound, and a diluent, solvent or otherwise carrier permitting an application. This "dressing composition", also referred to herein as "dressing" or "seed dressing", relates to a substance formulation which is a liquid or a gel, and of such a and which contains active agricultural compounds, and additionally may also contain other components, such as fillers, diluents, solvents, adhesive agents, dispersants, stabilizers, emulsifiers and colouring agents. In some embodiments, the dressing may be an adhesive powder. In the following description, all the positional information and directional information, such as e.g. top, bottom, above, below, upwards, downwards, vertical, horizontal, etc. relate to the upright position of the sowing device according to the invention as illustrated in the figures and corresponding to their practical use.

As used herein, the term an "underlying surface" is understood to be an agricultural soil or other solid medium onto which the plant propagation material, such as seeds and seedlings, are applied.

The term "plant propagation material" herein may refer to any seed, seedling, tuber, stem cutting or otherwise useful material for growing and propagating plants or crops. Many plant species, such as several fruits and ornamental plant species, are commonly reproduced by vegetative propagation (or "clonal propagation" or "vegetative reproduction"). Preferably it may refer to seeds, which are usually composed of individual plant propagation materials.

The term "seeds" herein may be granular seeds, pelleted granular seeds, dummy seeds or combinations thereof. Advantageously, "dummy seeds", i.e. particles that are not plant propagation materials may be sown and treated alongside the actual seeds. Such "dummy seeds" may be useful in e.g. spacing apart smaller seeds or may be specifically sowed to carry phytotoxic dressing in e.g. rows parallel and spaced apart from rows of seeds, or fertilizers and growth enhancers to improve the soil quality.

Yet further, where plant propagation materials are employed that are very small, or irregular in shape and weight, these may be difficult to sow in regular distribution with a single seedling per cell, and with a straight row. Accordingly, there may be a number of erroneously planted seeds, and hence some cells will have more than one seed, while others, none. With high seed costs and largely for automated harvesting, it is not desirable simply place multiple seeds per cell, and then remove them to allow only a single plant in due time. Applicants have found that beneficially, seeds or propagation materials in general may then be put through a process called "pelleting", wherein preferably an inert material is coated onto the seeds, thereby forming a more regular and uniform shape and size, e.g. wherein tiny Petunia seeds are pelleted to an identical size and shape as lettuce seeds. The thus pelleted seeds have several benefits, are several, including easier use of standardized equipment, a more regular spread of the seeds, and a higher rate of selective coating with the dressing composition. This in turn may reduce the need for thinning of fields, and easier automation in greenhouse applications seed starting. Preferably, the pelleting material used on the seeds is selected to absorb water quickly, ensuring the uniform moisture around the seeds, and thereby increasing germination rates.

The term "seed" herein preferably relates to a seed of a crop or plant species including but not limited to corn (*Zea mays*), *Brassica* sp. (e.g., *B. napus, B. rapa. B. juncea*), alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (Carthamus tinctorius), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (Cofea spp.), coconut (*Cocos nucifera*), pineapple (*Ananas comosus*), citrus trees (Citrus spp.), cocoa (*Theobroma cacao*), tea (*Camellia sinensis*), banana (Musa spp.), avocado (*Persea americana*), fig (*Ficus* casica), guava (*Psidium guajava*), mango (*Mangifera indica*), olive (*Olea europaea*), papaya (*Carica papaya*), cashew (*Anacardium* occidental), macadamia (*Macadamia integrifolia*), almond (*Prunus amygdalus*), sugar beets (*Beta vulgaris*), sugarcane (*Saccharum* spp.), oats, barley, vegetables, ornamentals, woody plants such as conifers and deciduous trees, squash, pumpkin, hemp, zucchini, apple, pear, quince, melon, plum, cherry, peach, nectarine, apricot, strawberry, grape, raspberry, blackberry, soybean, sorghum, sugarcane, rapeseed, clover, carrot, and *Arabidopsis thaliana*.

In a preferred embodiment, the seed may be of any vegetables species including but not limited to tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), cauliflower, broccoli, turnip, radish, spinach, asparagus, onion, garlic, pepper, celery, and members of the genus *Cucumis* such as cucumber (*C. sativus*), cantaloupe (*C. cantalupensis*), and musk melon (*C. melo*).

In another preferred embodiment, the plant propagation material may be of any ornamental species including but not limited to hydrangea (*Macrophylla hydrangea*), hibiscus (*Hibiscus rosa-sinensis*), petunias (*Petunia hybrida*), roses (*Rosa* spp.), azalea (*Rhododendron* spp.), tulips (*Tulipa* spp.), daffodils (*Narcissus* spp.), carnation (*Dianthus caryophyllus*), poinsettia (*Euphorbia pulcherrima*), and chrysanthemum.

In one embodiment, the plant propagation material may be of any conifer species including but not limited to conifers pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*), Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

In another preferred embodiment, the seed may be of any leguminous plant species including but not limited beans and peas. Beans include guar, locust bean, fenugreek, soybean, garden beans, cowpea, mungbean, lima bean, fava bean, lentils, chickpea pea, moth bean, broad bean, kidney bean, lentil, dry bean, etc. Legumes include, but are not limited to, *Arachis*, e.g., peanuts, *Vicia*, e.g., crown vetch, hairy vetch, adzuki bean, mung bean, and chickpea, *Lupinus*, e.g., lupine, *trifolium, Phaseolus*, e.g., common bean and lima bean, *Pisum*, e.g., field bean, *Melilotus*, e.g., clover, *Medicago*, e.g., alfalfa, Lotus, e.g., trefoil, lens, e.g., lentil, and false indigo. Typical forage and turf grass for use in the methods described herein include but are not limited to alfalfa, orchard grass, tall fescue, perennial ryegrass, creeping bent grass, lucerne, birdsfoot trefoil, clover, stylosanthes species, *Lotononis bainesii*, sainfoin and redtop. Other grass species include barley, wheat, oat, rye, orchard grass, guinea grass, sorghum or turf grass plant.

In another preferred embodiment, the seed may be selected from the following crops or vegetables: corn, wheat, sorghum, soybean, tomato, cauliflower, radish, cabbage, canola, lettuce, rye grass, grass, rice, cotton, sunflower and the like.

It is understood that the term "seed" or "seedling" is not limited to a specific or particular type of species or seed. The term "seed" or "seedling" can refer to seed from a single plant species, a mixture of seed from multiple plant species, or a seed blend from various strains within a plant species.

In another preferred embodiment, crop plant propagation materials may include but are not limited to rice, corn, wheat, barley, oats, soybean, cotton, sunflower, alfalfa, sorghum, rapeseed, sugarbeet, tomato, bean, carrot, tobacco or flower seeds.

Vegetative propagation is the ability of plants to reproduce without sexual reproduction, by producing new, genetically identical, plants from existing vegetative structures. The most common method of artificial vegetative propagation involves removal of parts (commonly referred to as "cuttings") from the parent plant and placed in a suitable environment where they can grow into a whole new plant. Cutting takes advantage of the ability of plants to form adventitious roots under certain conditions, and the resulting plant is a clone of the parent plant. By plant "parts" is intended all above ground vegetative parts of crop plants such as primary or secondary shoots, leaf, stems, branches, and the like. The methods are useful for any portion of the plant from which adventitious roots can form in the cultivation medium. In some embodiments, the plant part or cutting is a shoot. The shoot can be at least about 1 cm, at least about 2 cm, at least about 3 cm, at least about 5 cm, or larger. The present invention also relates to describes methods for clonally propagating agricultural crop plants, particularly maize, sorghum, wheat, cotton, rice, soybean, sugar-beet, sugarcane, tobacco, barley, and oilseed rape crop plants. In a preferred embodiment, the plants may be clonally propagated in a purely soil based system. In such a system, the root system of the plants must remain in a sufficiently aqueous environment in order to survive and grow roots. Methods useful for the preparation of plant propagation materials may further preferably comprise removing a part (or "cutting") from a crop plant, such as a primary or secondary shoot or stem, and placing it in a suitable medium sufficient to support the development of one or more roots in the medium. The new plant can then be grown under suitable conditions into a mature plant. Where such cuttings or seedlings are employed, often these are allowed to fall into indentations in the soil prepared prior to the seeding or planting. Seeds on the other hand are usually allowed to fall into furrows, trenches or otherwise prepared plant receiving cavities, which are then usually closed up after sowing to prevent loss of the seeds due to e.g. wind or animals.

The liquid seed dressing composition used in the present invention may comprise a liquid diluent material and one or more agricultural compounds. The activity of compositions comprising agricultural compounds according to the invention may be adapted to prevailing circumstances, by including other active substances.

As used herein, the term "agricultural compound" herein relates to compounds such as those fungicidal, insecticidal and/or growth-promoting effects, i.e. compounds and substances known to assist the growth of crops, comprising chemical or biological substances including but not limited to micronutrients, insecticides, for protecting against sucking and eating insects; fungicides for protecting against fungal pathogens; inoculants, antibacterials, herbicides; safeners; immune-response-triggering compounds; biologicals, biosimilars, gene modulating seed dressings; growth regulators; and crop enhancers that offer specific, chemically induced, physiological responses of plants that increase and/or improve yields, in particular under abiotic stress; as well as diluents, solvents, carriers, emulsifiers, viscosity modifiers, stabilizers, encapsulants and/or any colorants, and any combinations thereof. Preferred micronutrients include Zinc, Molybdenum, Manganese, Magnesium, Boron, Copper, Iron, Nickel, and Chlorine.

The dressing composition may be applied at application stage, which herein relates to the viscosity and concentration that allows application as a fluid to a plant propagation material.

The agricultural components may be stored in one or more reservoir, e.g. in cartridges or cannisters, as final compositions ready for us, also referred to herein as a "tank mix"; or as a concentrate, further referred to as "pre-mix", which requires a diluent or carrier for formation of the tank mix composition. As used herein, the term "herbicide," means and includes an active material that kills, controls, or otherwise adversely affects the growth of plants.

As used herein, the term "insecticide," means and includes an active material that kills, regulates, or otherwise adversely affects the growth of insects. Exemplary bactericides include chlortetracycline, oxytetracycline, streptomycin.

As used herein, the term "pesticide," means and includes an active material or substance that kills, regulates, or otherwise adversely affects the growth of pests (e.g., insects, mites, ticks, nematodes, bacteria, fungi, diseases, and plants).

As used herein, the term "fungicide," means and includes an active material or substance that kills, controls, or otherwise adversely affects the growth of fungi or fungal spores.

Preferred agricultural compounds include those of chemical or biological in type, and in the case of biological could be further modified from the biological species derived in nature. Active substances include substances that control, repel or attract pests that damage or harm useful plants in general, but also substances that improve the growth of a useful plant, such as plant growth regulators, and substances that improve the performance of the active substance, such as synergists. Examples are insecticides, acaricides, nematicides, molluscicides, aligicides, virusicides, rodenticide, bactericides, fungicides, chemosterilants, anthelmintics. Examples of a biological active substance include baculovirus, plant extract, and bacteria, advantageously combined with other substances which may also have further surprising advantages which can also be described, in a wider sense, as synergistic activity. Examples of synergistic activity include better tolerance by plants, reduced phytotoxicity, insects can be controlled in their different development stages, or better behaviour relating to production, for example grinding or mixing, storage or use. By way of non-limiting example, if used, the at least one additional pesticide employed in the seed dressing compositions may be at least one of an insecticide, an acaricide (e.g., miticide, ixodicide, scabicide, archnicide, etc.), a nematocide, a bactericide, a biocide, an anthropodicide, a molluscide, a fungicide, and a herbicide.

Preferred agricultural compounds include, but are not limited to the following compounds: a compound selected from the group of substances consisting of petroleum oils, 1,1-bis(4-chlorophenyl)-2-ethoxyethanol, 2,4-dichlorophenyl benzenesulfonate, 2-fluoro-N-methyl-N-1-naphthylacetamide, 4-chlorophenyl phenyl sulfone, acetoprole, aldoxycarb, amidithion, amidothioate, amiton, amiton hydrogen oxalate, amitraz, aramite, arsenous oxide, azobenzene, azothoate, benomyl, benoxafos, benzyl benzoate, bixafen, brofenvalerate, bromocyclen, bromophos, bromopropylate, buprofezin, butocarboxim, butoxycarboxim, butylpyridaben, calcium polysulfide, camphechlor, carbanolate, carbophenothion, cyclobutrifluram, cymiazole, chinomethionat, chlorbenside, chlordimeform, chlordimeform hydrochloride, chlorfenethol, chlorfenson, chlorfensulfide, chlorobenzilate, chloromebuform, chloromethiuron, chloropropylate, chlorthiophos, cinerin I, cinerin II, cinerins, closantel, coumaphos, crotamiton, crotoxyphos, cufraneb, cyanthoate, DCPM, DDT, demephion, demephion-O, demephion-S, demeton-methyl, demeton-O, demeton-O-methyl, demeton-S, demeton-S-methyl, demeton-S-methylsulfon, dichlofluanid, dichlorvos, dicliphos, dienochlor, dimefox, dinex, dinex-diclexine, dinocap-4, dinocap-6, dinocton, dinopenton, dinosulfon, dinoterbon, dioxathion, diphenyl sulfone, disulfiram, DNOC, dofenapyn, doramectin, endothion, eprinomectin, ethoate-methyl, etrimfos, fenazaflor, fenbutatin oxide, fenothiocarb, fenpyrad, fenpyroximate, fenpyrazamine, fenson, fentrifanil, flubenzimine, flucycloxuron, fluenetil, fluorbenside, flupentiofenox, FMC 1137, formetanate, formetanate hydrochloride, formparanate, gamma-HCH, glyodin, halfenprox, hexadecyl cyclopropanecarboxylate, isocarbophos, jasmolin I, jasmolin II, jodfenphos, lindane, malonoben, mecarbam, mephosfolan, mesulfen, methacrifos, methyl bromide, metolcarb, mexacarbate, milbemycin oxime, mipafox, monocrotophos, morphothion, moxidectin, naled, 4-chloro-2-(2-chloro-2-methyl-propyl)-5-[(6-iodo-3-pyridypnnethoxy]pyridazin-3-one, nifluridide, nikkomycins, nitrilacarb, nitrilacarb 1:1 zinc chloride complex, omethoate, oxazosulfyl, oxydeprofos, oxydisulfoton, pp'-DDT, parathion, permethrin, phenkapton, phosalone, phosfolan, phosphamidon, polychloroterpenes, polynactins, proclonol, promacyl, propoxur, prothidathion, prothoate, pyrethrin I, pyrethrin II, pyrethrins, pyridaphenthion, pyrimitate, quinalphos, quintiofos, R-1492, phosglycin, rotenone, schradan, sebufos, selamectin, sophamide, SSI-121, sulfiram, sulfluramid, sulfotep, sulfur, diflovidazin, tau-fluvalinate, TEPP, terbam, tetradifon, tetrasul, thiafenox, thiocarboxime, thiofanox, thiometon, thioquinox, thuringiensin, triamiphos, triarathene, triazophos, triazuron, trifenofos, trinactin, vamidothion, vaniliprole, bethoxazin, copper dioctanoate, copper sulfate, cybutryne, dichlone, dichlorophen, endothal, fentin, hydrated lime, nabam, quinoclamine, quinonamid, simazine, triphenyltin acetate, triphenyltin hydroxide, crufomate, piperazine, thiophanate, chloralose, fenthion, pyridin-4-amine, strychnine, 1-hydroxy-1H-pyridine-2-thione, 4-(quinoxalin-2-ylamino)benzenesulfonamide, 8-hydroxyquinoline sulfate, bronopol, copper hydroxide, cresol, dipyrithione, dodicin, fenaminosulf, formaldehyde, hydrargaphen, kasugamycin, kasugamycin hydrochloride hydrate, nickel bis(dimethyldithiocarbamate), nitrapyrin, octhilinone, oxolinic acid, oxytetracycline, potassium hydroxyquinoline sulfate, probenazole, streptomycin, streptomycin sesquisulfate, tecloftalam, thiomersal, *Adoxophyes orana* GV, *Agrobacterium radiobacter, Amblyseius* spp., *Anagrapha falcifera* NPV, *Anagrus atomus, Aphelinus abdominalis, Aphidius colemani, Aphidoletes aphidimyza, Autographa californica* NPV, *Bacillus sphaericus* Neide, *Beauveria brongniartii, Chrysoperla carnea, Cryptolaemus montrouzieri, Cydia pomonella* GV, *Dacnusa sibirica, Diglyphus isaea, Encarsia formosa, Eretmocerus eremicus, Heterorhabditis bacteriophora and H. megidis, Hippodamia convergens, Leptomastix dactylopii, Macrolophus caliginosus, Mamestra brassicae* NPV, *Metaphycus helvolus, Metarhizium anisopliae* var. *acridum, Metarhizium anisopliae* var. *anisopliae, Neodiprion sertifer* NPV and *N. lecontei* NPV, *Orius* spp., *Paecilomyces fumosoroseus, Phytoseiulus persimilis, Steinernema bibionis, Steinernema carpocapsae, Steinernema feltiae, Steinernema glaseri, Steinernema riobrave, Steinernema riobravis, Steinernema scapterisci, Steinernema* spp., *Trichogramma* spp., *Typhlodronnus occidentalis, Verticillium lecanii,* apholate, bisazir, busulfan, *dimatif,* hemel, hempa, metepa, methiotepa, methyl apholate, morzid, penfluron, tepa, thiohempa, thiotepa, tretamine, uredepa, (E)-dec-5-en-1-yl acetate with (E)-dec-5-en-1-ol, (E)-tridec-4-en-1-yl acetate, (E)-6-methylhept-2-en-4-ol, (E,Z)-tetradeca-4,10-dien-1-yl acetate, (Z)-dodec- 7-en-1-yl acetate, (Z)-hexadec-11-enal, (Z)-hexadec-11-en-1-yl acetate, (Z)-hexadec-13-en-11-yn-1-yl acetate, (Z)-icos-13-en-10-one, (Z)-tetradec-7-en-1-al, (Z)-tetradec-9-en-1-ol, (Z)-tetradec-9-en-1-yl acetate, (7E,9Z)-dodeca-7,9-dien-1-yl acetate, (9Z,11E)-tetradeca-9,11-dien-1-yl acetate, (9Z,12E)-tetradeca-9,12-dien-1-yl acetate, 14-methyloctadec-1-ene, 4-methylnonan-5-ol with 4-methylnonan-5-one, alpha-multistriatin, brevicomin, codlelure, codlemone, cuelure, disparlure, dodec-8-en-1-yl acetate, dodec-9-en-1-yl acetate, dodeca-8, 10-dien-1-yl acetate, dominicalure, ethyl 4-methyloctanoate, eugenol, frontalin, grandlure, grandlure I, grandlure II, grandlure III, grandlure IV, hexalure, ipsdienol, ipsenol, japonilure, lineatin, litlure, looplure, medlure, megatomoic acid, methyl eugenol, muscalure, octadeca-2,13-dien-1-yl acetate, octadeca-3,13-dien-1-yl acetate, orfralure, oryctalure, ostramone, siglure, sordidin, sulcatol, tetradec-11-en-1-yl acetate, trimedlure, trimedlure A, trimedlure $B_1$, trimedlure B2, trimedlure C, trunc-call, 2-(octylthio)ethanol, butopyronoxyl, butoxy(polypropylene glycol), dibutyl adipate, dibutyl phthalate, dibutyl succinate, diethyltoluamide, dimethyl carbate, dimethyl phthalate, ethyl hexanediol, hexamide, methoquin-butyl, methylneodecanamide, oxamate, picaridin, 1-dichloro-1-nitroethane, 1,1-dichloro-2,2-bis(4-ethylphenyl)ethane, 1,2-dichloropropane with 1,3-dichloropropene, 1-bromo-2-chloroethane, 2,2,2-trichloro-1-(3,4-dichlorophenyl)ethyl acetate, 2,2-dichlorovinyl 2-ethylsulfinylethyl methyl phosphate, 2-(1,3-dithiolan-2-yl)phenyl dimethylcarbamate, 2-(2-butoxyethoxy)ethyl thiocyanate, 2-(4,5-dimethyl-1,3-dioxolan-2-yl)phenyl methylcarbamate, 2-(4-chloro-3,5-xylyloxy) ethanol, 2-chlorovinyl diethyl phosphate, 2-imidazolidone, 2-isovalerylindan-1,3-dione, 2-methyl(prop-2-ynyl)aminophenyl methylcarbamate, 2-thiocyanatoethyl laurate, 3-bromo-1-chloroprop-1-ene, 3-methyl-1-phenylpyrazol-5-yl dimethylcarbamate, 4-methyl(prop-2-ynyl)amino-3,5-xylyl methylcarbamate, 5,5-dimethyl-3-oxocyclohex-1-enyl dimethylcarbamate, acethion, acrylonitrile, aldrin, allosamidin, allyxycarb, alpha-ecdysone, aluminium phosphide, aminocarb, anabasine, athidathion, azamethiphos, *Bacillus thuringiensis* delta endotoxins, barium hexafluorosilicate, barium polysulfide, barthrin, Bayer 22/190, Bayer 22408, beta-cyfluthrin, beta-cypermethrin, bioethanomethrin, biopermethrin, bis(2-chloroethyl) ether, borax, bromfenvinfos, bromo-DDT, bufencarb, butacarb, butathiofos, butonate, calcium arsenate, calcium cyanide, carbon disulfide, carbon tetrachloride, cartap hydrochloride, cevadine, chlorbicyclen, chlordane, chlordecone, chloroform, chloropicrin, chlorphoxim, chlorprazophos, cis-resmethrin, cismethrin, clocythrin, copper acetoarsenite, copper arsenate, copper oleate, coumithoate, cryolite, CS 708, cyanofenphos, cyanophos, cyclethrin, cythioate, d-tetramethrin, DAEP, dazomet, decarbofuran, diamidafos, dicapthon, dichlofenthion, dicresyl, dicyclanil, dieldrin, diethyl 5-methylpyrazol-3-yl phosphate, dilor, dimefluthrin, dimetan, dimethrin, dimethylvinphos, dimetilan, dinoprop, dinosaur, dinoseb, diofenolan, dioxabenzofos, dithicrofos, DSP, ecdysterone, EI 1642, EMPC, EPBP, etaphos, ethiofencarb, ethyl formate, ethylene dibromide, ethylene dichloride, ethylene oxide, EXD, fenchlorphos, fenethacarb, fenitrothion, fenoxacrim, fenpirithrin, fensulfothion, fenthion-ethyl, flucofuron, fosmethilan, fospirate, fosthietan, furathiocarb, furethrin, guazatine, guazatine acetates, sodium tetrathiocarbonate, halfenprox, HCH, HEOD, heptachlor, heterophos, HHDN, hydrogen cyanide, hyquincarb, IPSP, isazofos, isobenzan, isodrin, isofenphos, isolane, isoprothiolane, isoxathion, juvenile hormone I, juvenile hormone II, juvenile hormone III, kelevan, kinoprene, lead arsenate, leptophos, lirimfos, lythidathion, m-cumenyl methylcarbamate, magnesium phosphide, mazidox, mecarphon, menazon, mercurous chloride, mesulfenfos, metam, metam-potassium, metam-sodium, methanesulfonyl fluoride, methocrotophos, methoprene, methothrin, methoxychlor, methyl isothiocyanate, methylchloroform, methylene chloride, metoxadiazone, mirex, naftalofos, naphthalene, NC-170, nicotine, nicotine sulfate, nithiazine, nornicotine, 0-5-dichloro-4-iodophenyl O-ethyl ethylphosphonothioate, O,O-diethyl O-4-methyl-2-oxo-2H-chromen-7-ylphosphorothioate, O,O-diethyl O-6-methyl-2-propylpyrimidin-4-yl phosphorothioate, O,O,O',O'-tetrapropyl dithiopyrophosphate, oleic acid, para-dichlorobenzene, parathion-methyl, pentachlorophenol, pentachlorophenyl laurate, PH 60-38, phenkapton, phosnichlor, phosphine, phoxim-methyl, pirimetaphos, polychlorodicyclopentadiene isomers, potassium arsenite, potassium thiocyanate, precocene I, precocene II, precocene III, primidophos, profluthrin, promecarb, prothiofos, pyrazophos, pyresmethrin, quassia, quinalphos-methyl, quinothion, rafoxanide, resmethrin, rotenone, kadethrin, ryania, ryanodine, sabadilla), schradan, sebufos, SI-0009, thiapronil, sodium arsenite, sodium cyanide, sodium fluoride, sodium hexafluorosilicate, sodium pentachlorophenoxide, sodium selenate, sodium thiocyanate, sulcofuron, sulcofuron-sodium, sulfuryl fluoride, sulprofos, tar oils, tazimcarb, TDE, tebupirimfos, temephos, terallethrin, tetrachloroethane, thicrofos, thiocyclam, thiocyclam hydrogen oxalate, thionazin, thiosultap, thiosultap-sodium, tralomethrin, transpermethrin, triazamate, trichlormetaphos-3, trichloronat, trimethacarb, tolprocarb, triclopyricarb, triprene, veratridine, veratrine, XMC, zetamethrin, zinc phosphide, zolaprofos, and meperfluthrin, tetramethylfluthrin, bis (tributyltin) oxide, bromoacetamide, ferric phosphate, niclosamide-olamine, tributyltin oxide, pyrimorph, trifenmorph, 1,2-dibromo-3-chloropropane, 1,3-dichloropropene, 3,4-dichlorotetrahydrothiophene 1,1-dioxide, 3-(4-chlorophenyl)-5-methylrhodanine, 5-methyl-6-thioxo-1,3,5-thiadiazinan-3-ylacetic acid, 6-isopentenylaminopurine, benclothiaz, cytokinins, DCIP, furfural, isamidofos, kinetin, *Myrothecium verrucaria* composition, tetrachlorothiophene, xylenols, zeatin, potassium ethylxanthate, acibenzolar, acibenzolar-S-methyl, *Reynoutria sachalinensis* extract, alpha-chlorohydrin, antu, barium carbonate, bisthiosemi, brodifacoum, bromadiolone, bromethalin, chlorophacinone, cholecalciferol, coumachlor, coumafuryl, coumatetralyl, crimidine, difenacoum, difethialone, diphacinone, ergocalciferol, flocoumafen, fluoroacetamide, flupropadine, flupropadine hydrochloride, norbormide, phosacetim, phosphorus, pindone, pyrinuron, scilliroside, sodium fluoroacetate, thallium sulfate, warfarin, 2-(2-butoxyethoxy)ethyl piperonylate, 5-(1,3-benzodioxo1-5-yl)-3-hexylcyclohex-2-enone, farnesol with nerolidol, verbutin, MGK 264, piperonyl butoxide, piprotal, propyl isomer, 5421, sesamex, sesasmolin, sulfoxide, anthraquinone, copper naphthenate, copper oxychloride, dicyclopentadiene, thiram, zinc naphthenate, ziram, imanin, ribavirin, mercuric oxide, thiophanate-methyl, azaconazole, bitertanol, bromuconazole, cyproconazole, difenoconazole, diniconazole, epoxiconazole, fenbuconazole, fluquinconazole, flusilazole, flutriafol, furametpyr, hexaconazole, imazalil, imibenconazole, ipconazole, metconazole, myclobutanil, paclobutrazole, pefurazoate, penconazole, prothioconazole, pyrifenox, prochloraz, propiconazole, pyrisoxazole, simeconazole, tebuconazole, tetraconazole, triadimefon, triadimenol, triflumizole, triticonazole, ancymidol, fenarimol, nuarimol, bupirimate, dimethirimol, ethirimol, dodemorph, fenpropidine, fenpropimorph, spiroxamine, tridemorph, cyprodinil, mepanipyrim, pyrimethanil, fenpiclonil, fludioxonil, benalaxyl, furalaxyl, metalaxyl, R-metalaxyl, ofurace, oxadixyl, carbendazim, debacarb, fuberidazole, thiabendazole, chlozolinate, dichlozoline, myclozoline, procymidone, vinclozoline, boscalid, carboxin, fenfuram, flutolanil, mepronil, oxycarboxin, penthiopyrad, thifluzamide, dodine, iminoctadine, azoxystrobin, dimoxystrobin, enestroburin, fenaminstrobin, flufenoxystrobin, fluoxastrobin, kresoxim-methyl, metominostrobin, trifloxystrobin, orysastrobin, picoxystrobin, pyraclostrobin, pyrametostrobin, pyraoxystrobin, ferbam, mancozeb, maneb, metiram, propineb, zineb, captafol, captan, fluoroimide, folpet, tolylfluanid, bordeaux mixture, copper oxide, mancopper, oxine-copper, nitrothal-isopropyl, edifenphos, iprobenphos, phosdiphen, tolclofos-methyl, anilazine, benthiavalicarb, blasticidin-S, chloroneb, chlorothalonil, cyflufenamid, cymoxanil, diclocymet, diclomezine, dicloran, diethofencarb, dimethomorph, flumorph, dithianon, ethaboxam, etridiazole, famoxadone, fenamidone, fenoxanil, ferimzone, fluazinam, fluopicolide, flusulfamide, fluxapyroxad, fenhexamid, fosetyl-aluminium, hymexazol, iprovalicarb, cyazofamid, methasulfocarb, metrafenone, pencycuron, phthalide, polyoxins, propamocarb, pyribencarb, proquinazid, pyroquilon, pyriofenone, quinoxyfen, quintozene, tiadinil, triazoxide, tricyclazole, triforine, validamycin, valifenalate, zoxamide, mandipropamid, isopyrazam, sedaxane, benzovindiflupyr, pydiflumetofen, 3-difluoromethyl-1-methyl-1H-pyrazole-4-carboxylic acid (3',4',5'-trifluoro-biphenyl-2-yl)-amide, isoflucypram, isotianil, dipymetitrone, 6-ethyl-5,7-dioxo-pyrrolo[4,5][1,4]dithiino[1,2-c]isothiazole-3-carbonitrile, 2-(difluoromethyl)-N-[3-ethyl-1,1-dimethyl-indan-4-yl]pyridine-3-carboxamide, 4-(2,6-difluorophenyl)-6-methyl-5-phenyl-pyridazine-3-carbonitrile, (R)-3-(difluoromethyl)-1-methyl-N-[1,1,3-trimethylindan-4-yl]pyrazole-4-carboxamide, 4-(2-bronno-4-fluoro-phenyl)-N-(2-chloro-6-fluoro-phenyl)-2,5-dimethyl-pyrazol-3-amine, 4-(2-bromo-4-fluorophenyl)-N-(2-chloro-6-fluorophenyl)-1,3-dimethyl-1H-pyrazol-5-amine, fluindapyr, coumethoxy-strobin (jiaxiangjunzhi), lybennnixianan, dichlobentiazox, mandestrobin, 3-(4,4-difluoro-3,4-dihydro-3,3-dimethylisoquinolin-1-yl)quinolone, 2-[2-fluoro-6-[(8-fluoro-2-methyl-3-quinolypoxy]phenyl]propan-2-ol, oxathiapiprolin, tert-butyl N46-[[[(1-methyltetrazol-5-yl)-phenyl-methylene]amino]oxymethyl]-2-pyridyn-carbamate, pyraziflumid, inpyrfluxam, trolprocarb, mefentrifluconazole, ipfentrifluconazole, 2-(difluoromethyl)-N-[(3R)-3-ethyl-1,1-dimethyl-indan-4-yl]pyridine-3-carboxamide, N'-(2,5-dimethyl-4-phenoxy-phenyl)-N-ethyl-N-methyl-formamidine, N'-[4-(4,5-dichlorothiazol-2-yl)oxy-2,5-dimethyl-phenyl]-N-ethyl-N-methyl-formamidine, [2-[3-[2-[1-[2-[3,5-bis(difluoromethyl)pyrazol-1-yl]acetyl]-4-piperidyl]thiazol-4-yl]-4,5-dihydroisoxazol-5-yl]-3-chloro-phenyl] methanesulfonate, but-3-ynyl N-[6-[[[(Z)-[(1-methyltetrazol-5-yl)-phenyl-methylene]-amino]oxymethyl]-2-pyridyl]carbamate, methyl N-[[5-[4-(2,4-dimethylphenyl)triazol-2-yl]-2-methyl-phenyl]-methyl]carba mate, 3-chloro-6-methyl-5-phenyl-4-(2,4,6-trifluorophenyl)pyridazine, pyridachlometyl, 3-(difluoromethyl)-1-methyl-N-[1,1,3-trimethylindan-4-yl]pyrazole-4-carboxamide, 1-[2-[[1-(4-chlorophenyl)-pyrazol-3-yl]oxymethyl]-3-methyl-phenyl]-4-methyl-tetrazol-5-one, 1-methyl-4-[3-methyl-2-[[2-methyl-4-(3,4,5-trimethylpyrazol-1-yl)phenoxy]methyl]phenyntetrazol-5-one, aminopyrifen, ametoctradin, amisulbrom, penflufen, (2,2E)-5-[1-(4-chlorophenyl)pyrazo]-3-yl]oxy-2-methoxyimino-N,3-dimethyl-pent-3-enamide, floryl-picoxamid, fenpicoxamid, tebufloquin, ipflufenoquin, quinofumelin, isofetamid, N-[2-[2,4-dichloro-phenoxy]phenyl]-3-(difluoromethyl)-1-methyl-pyrazole-4-carboxamide, N-[2-[2-chloro-4-(trifluoromethyl)-phenoxy]phenyl]-3-(difluoromethyl)-1-methyl-pyrazole-4-carboxamide, benzothiostrobin, phenamacril, 5-amino-1,3,4-thiadiazole-2-thiol zinc salt (2:1), fluopyram, flutianil, fluopimomide, pyrapropoyne, picarbutrazox, 2-(difluoromethyl)-N-(3-ethyl-1,1-dimethyl-indan-4-y0pyridine-3-carboxamide, 2-(difluoromethyl)-N-((3R)-1,1, 3-trimethylindan-4-yl)pyridine-3-carboxamide, 4-[[6-[2-(2,4-difluorophenyI)-1,1-difluoro-2-hydroxy-3-(1,2,4-triazol-1-yl)propyl]-3-pyridyl]oxy]benzonitrile, nnetyltetra prole, 2-(difluoromethyl)-N-((3R)-1,1,3-trimethylindan-4-yl)pyridine-3-carboxamide, α-(14-dimethylethyl)-α-[4'-(trifluoromethoxy)[1,1'-biphenyl]-4-yl]-5-pyrimidinemethanol, fluoxapiprolin, enoxastrobin, 4-[[6-[2-(2,4-difluorophenyl)-1,1-difluoro-2-hydroxy-3-(1,2,4-triazol-1-yl)propyl]-3-pyridyl]oxy] benzonitrile, 4-[[6-[2-(2,4-difluorophenyl)-1,1-difluoro-2-hydroxy-3-(5-sulfanyl-1,2,4-triazol-1-yl)propyl]-3-pyridyl]oxy] benzonitrile, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile, trinexapac, coumoxystrobin, zhongshengmycin, thiodiazole copper, zinc thiazole, amectotractin, iprodione; N-methoxy-N-[[4-[5-(trifluoromethyl)-1,2,4-oxadiazol-3-yl]phenyl] methyl]cyclopropanecarboxannide, N,2-di-methoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]-methyl]urea, N-[[4-[5-(trifluoromethyl)-1,2,4-oxadiazol-3-yl]phenyl]methyl]propanamide, 4,4-dimethyl-2-[[4-[5-(trifluoromethyl)-1,2,4-oxadiazol-3-yl] phenyl]methyl]isoxazolidin-3-one, 5,5-dimethyl-2-[[4-[5-(trifluoro-methyl)-1,2,4-oxadiazol-3-yl]phenyl]methyl] isoxazolidin-3-one, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]-phenyl]methyl]-1,2,4-triazol-3-amine. The compounds in this paragraph may be prepared from the methods described in WO 2017/055473, WO 2017/055469, WO 2017/093348 and WO 2017/118689; 2-[6-(4-chlorophenoxy)-2-(trifluoromethyl)-3-pyridyl]-1-(1,2,4-triazol-1-yl) propan-2-ol (this compound may be prepared from the methods described in WO 2017/029179); 2-[6-(4-bromophenoxy)-2-(trifluoromethyl)-3-pyridyl]-1-(1,2,4-triazol-1-yl)propan-2-ol (this compound may be prepared from the methods described in WO 2017/029179); 3-[2-(1-chlorocyclopropyl)-3-(2-fluorophenyl)-2-hydroxy-propyl]imidazole-4-carbonitrile (this compound may be prepared from the methods described in WO 2016/156290); 3-[2-(1-chlorocyclopropyl)-3-(3-chloro-2-fluoro-phenyl)-2-hydroxy-propyl]imidazole-4-carbonitrile (this compound may be prepared from the methods described in WO 2016/156290); (4-phenoxyphenyl)methyl 2-amino-6-methyl-pyridine-3-carboxylate (this compound may be prepared from the methods described in WO 2014/006945); 2,6-Dimethyl-1H, 5H-(this compound may be prepared from the methods described in WO 2011/138281): N-methyl-4-[5-(trifluoromethyl)-1,2,4-oxadiazol-3-yl]benzenecarbothioamide. N-methyl-4-[5-(trifluoromethyl)-1,2,4-oxadiazol-3-yl]benzamide; (Z,2E)-5-[1-(2,4-dichlorophenyl)pyrazo]-3-yl]oxy-2-methoxyimino-N,3-dimethyl-pent-3-enamide (this compound may be prepared from the methods described in WO 2018/153707); N'-(2-chloro-5-methyl-4-phenoxy-phenyl)-N-ethyl-N-methyl-formamidine. N'-[2-chloro-4-(2-fluorophenoxy)-5-methyl-phenyl]-N-ethyl-N-methyl-formamidine (this compound may be prepared from the methods described in WO 2016/202742); 2-(difluoromethyl)-N-[(3S)-3-ethyl-1,1-dimethyl-indan-4-yl]pyridine-3-carboxamide (this compound may be prepared from the methods described in WO 2014/095675).

In one or more embodiments, the at least one additional pesticide may be used to control at least one of insects, mites, ticks, nematodes, bacteria, fungi, diseases, and plants (e.g., weeds). The at least one additional pesticide may be, for example, at least one of an insecticide, a fungicide, and a herbicide, each of which is described in further detail below.

Non-limiting examples of useful fungicides may include aromatic hydrocarbons, benzimidazoles, benzothiadiazole, carboxamides, carboxylic acid amides, morpholines, phenylamides, phosphonates, quinone outside inhibitors (e.g. strobilurins), thiazolidines, thiophanates, thiophene carboxamides, and triazoles. Further non-limiting examples of fungicides include acibenzolar-S-methyl, azoxystrobin, benalaxyl, bixafen, boscalid, carbendazim, chlorothalonil, cyclobutrifluram, cyproconazole, dimethomorph, epoxiconazole, fludioxonil, fluopyram, fluxapyroxad, fluoxastrobin, flutianil, flutolanil, fluxapyroxad, fosetyl-A1, ipconazole, isopyrazam, kresoxim-methyl, mefenoxam, metalaxyl, metconazole, myclobutanil, orysastrobin, penflufen, penthiopyrad, picoxystrobin, propiconazole, prothiconazole, pyraclostrobin, sedaxane, silthiofam, tebuconazole, thiabendazole, thifluzamide, thiophanate, tolclofos-methyl, trifloxystrobin, and triticonazole. In one embodiment, the fungicide may be selected from the group consisting of prothioconazole, fluoxastrobin, ipconazole, silthiofam, metalaxyl, trifloxystrobin, pyraclostrobin, fluxapyroxad, sedaxane, fluopyram, mefenoxam, penflufen, azoxystrobin, and combinations thereof.

Further non-limiting examples of fungicidal compounds and combinations which may be included in the dressing compositions of the invention are (E)-N-methyl-2-[2-(2,5-dimethylphenoxymethyl)phenyl]-2-methoxy-iminoacetamide (SSF-129), 4 bromo 2 cyano N,N dimethyl-6 trifluoromethyl-benzimidazole-1 sulfonamide, [N (3 chloro 2,6 xylyl) 2 methoxyacetamido]butyrolactone, 4-chloro-2-cyano-N,N-dimethyl-5-p-tolylimidazole-1-sulfonamide (1KF-916, cyamidazosulfamid), 3-5-dichloro-N-(3-chloro-1-ethyl-1-methyl-2-oxopropyl)-4-methylbenzamide (RH-7281, zoxamide), N-allyl-4,5,-dimethyl-2-trimethylsilylthiophene-3-carboxamide (MON65500), N-(1-cyano-1,2-dimethylpropyl)-2-(2,4-dichlorophenoxy)-propionannide (AC382042), N (2 methoxy 5 pyridyl)cyclopropane carboxamide, acibenzolar (CGA245704) (e.g. acibenzolar-S-methyl), alanycarb, aldimorph, anilazine, azaconazole, azoxystrobin, benalaxyl, benomyl, benthiavalicarb, biloxazol, bitertanol, bixafen, blasticidin S, boscalid, bromuconazole, bupirimate, captafol, captan, carbendazim, carbendazim, chlorhydrate, carboxin, carpropamid, carvone, CGA41396, CGA41397, chinomethionate, chlorothalonil, chlorozolinate, clozylacon, copper containing compounds to give combintations such as copper oxychloride, copper oxyquinolate, copper sulfate, copper tallate and Bordeaux mixture, cyclufenamid, cymoxanil, cyproconazole, cyprodinil, debacarb, di 2 pyridyl disulfide 1,1' dioxide, dichlofluanid, diclomezine, dicloran diethofencarb, difenoconazole, difenzoquat, diflumetorim, O,O di iso propyl S benzyl thiophosphate, dimefluazole, dimetconazole, dimethomorph, dimethirimol, diniconazole, dinocap, dithianon, dodecyl dimethyl ammonium chloride, dodemorph, dodine, doguadine, edifenphos, epoxiconazole, ethirimol I, ethyl-(Z)-N-benzyl-N-([methyl(methyl-thioethylideneamino-oxycarbonyl)amino]thio)alaninate, etridiazole, famoxadone, fenamidone (RPA407213), fenarimol, fenbuconazole, fenfuram, fenhexamid (KBR2738), fenpiclonil, fenpropidin, fenpropimorph, fentin acetate, fentin hydroxide, ferbam, ferimzone, fluazinam, fludioxonil, flumetover, fluopyram, fluoxastrobin, fluoroimide, fluquinconazole, flusilazole, flutolanil, flutriafol, fluxapyroxad, folpet, fuberidazole, furalaxyl, furametpyr, guazatine, hexaconazole, hydroxyisoxazole, hymexazole, imazalil, imibenconazole, iminoctadine, iminoctadine triacetate, ipconazole, iprobenfos, iprodione, iprovalicarb (SZX0722), isopropanyl butyl carbamate, isoprothiolane, isopyrazam, kasugamycin, kresoxim-methyl, LY186054, LY211795, LY248908, mancozeb, mandipropamid, maneb, mefenoxam, metalaxyl, mepanipyrim, mepronil, metalaxyl, metconazole, metiram, metiram zinc, metominostrobin, myclobutanil, neoasozin, nickel dimethyldithiocarbamate, nitrothal iso-propyl, nuarimol, ofurace, organomercury compounds, oxadixyl, oxasulfuron, oxolinic acid, oxpoconazole, oxycarboxin, pefurazoate, penconazole, pencycuron, penflufen, penthiopyrad, phenazin oxide, phosetyl Al, phosphorus acids, phthalide, picoxystrobin (ZA1963), polyoxinD, polyram, probenazole, prochloraz, procymidone, propamocarb, propiconazole, propineb, propionic acid, prothioconazole, pyrazophos, pyrifenox, pyrimethanil, pyraclostrobin, pyroquilon, pyroxyfur, pyrrolnitrin, quaternary ammonium compounds, quinomethionate, quinoxyfen, quintozene, sedaxane, sipconazole (F-155), sodium pentachlorophenate, spiroxamine, streptomycin, sulfur, tebuconazole, tecloftalam, tecnazene, tetraconazole, thiabendazole, thifluzamid, 2 (thiocyanomethylthio)benzothiazole, thiophanate-methyl, thiram, timibenconazole, tolclofos methyl, tolylfluanid, triadimefon, triadimenol, triazbutil, triazoxide, tricyclazole, tridemorph, trifloxystrobin (CGA279202), triforine, triflumizole, triticonazole, validamycin A, vapam, vinclozolin, zineb and ziram, N-[9-(dichloromethylene)-1,2,3,4-tetra hydro-1,4-methanonaphthalen-5-yl]-3-(difluoromethyl)-1-methyl-1H-pyrazole-4-carboxamide [1072957-71-1], 1-methyl-3-difluoromethyl-1H-pyrazole-4-carboxylic acid (2-dichloromethylene-3-ethyl-1-methyl-indan-4-yl)-amide, and 1-methyl-3-difluoromethyl-4H-pyrazole-4-carboxylic acid [2-(2,4-dichloro-phenyl)-2-methoxy-1-methyl-ethyl]-amide.

In some instances, the liquid seed dressing composition may comprise a flowability agent and one or more agricultural compounds that are useful to improve the agronomic characteristics of the seed and/or a plant grown from the seed.

Further non-limiting examples of insecticides and nematicides include carbamates, diamides, macrocyclic lactones, neonicotinoids, organophosphates, phenylpyrazoles, pyrethrins, spinosyns, synthetic pyrethroids, tetronic and tetramic acids. For example, the liquid seed treatment composition may comprise one or more insecticides and nematicides selected from abamectin, aldicarb, aldoxycarb, bifenthrin, carbofuran, chlorantraniliprole, clothianidin, cyantraniliprole, cyclobutrifluram, cyfluthrin, cyhalothrin, cypermethrin, deltamethrin, dinotefuran, emamectin, ethiprole, fenamiphos, fipronil, flubendiamide, flupentiofenox, fosthiazate, imidacloprid, ivermectin, lambda-cyhalothrin, milbemectin, oxazosulfyl, tioxazafen, nitenpyram, oxamyl, permethrin, spinetoram, spinosad, spirodichlofen, spirotetramat, tefluthrin, thiacloprid, thiamethoxam, tioxazafen, and thiodicarb. In one embodiment, the insecticide or nematicide may be selected from the group consisting of clothianidin, thiamethoxam, tioxazafen, imidacloprid and combinations thereof. In a preferred embodiment, the liquid seed treatment composition comprises tioxazafen.

Preferred agrochemical compounds Abamectin, Acequinocyl, Acetamiprid, Acetoprole, Acrinathrin, Acynonapyr, Afidopyropen, Afoxalaner, Alanycarb, Allethrin, Alpha-Cypermethrin, Alphamethrin, Amidoflumet, Aminocarb, Azocyclotin, Bensultap, Benzoximate, Benzpyrimoxan, Beta-cyfluthrin, Beta-cypermethrin, Bifenazate, Bifenthrin, Binapacryl, Bioallethrin, Bioallethrin (S)-cyclopentylisomer, Bioresmethrin, Bistrifluron, Broflanilide, Brofluthrinate, Bromophos-ethyl, Buprofezine, Butocarboxim, Cadusafos, Carbaryl, Carbosulfan, Cartap, CASnumber: 1472050-04-6, CASnumber:1632218-00-8, CASnumber: 1808115-49-2, CASnumber:2032403-97-5, CASnumber: 2044701-44-0, CASnumber:2128706-05-6, CASnumber: 21249718-27-0, Chlorantraniliprole, Chlordane, Chlorfenapyr, Chloroprallethrin, Chromafenozide, Clenpirin, Cloethocarb, Clothianidin, 2-chlorophenylN-methylcarbamate(CPMC), Cyanofenphos, Cyantraniliprole, Cyclaniliprole, Cyclobutrifluram, Cycloprothrin, Cycloxaprid, Cyenopyrafen, Cyetpyrafen(orEtpyrafen), Cyflumetofen, Cyfluthrin, Cyhalodiannide, Cyhalothrin, Cypermethrin, Cyphenothrin, Cyromazine, Deltamethrin, Diafenthiuron, Dialifos, Dibrom, Dicloromezotiaz, Diflovidazine, Diflubenzuron, dimpropyridaz, Dinactin, Dinocap, Dinotefuran, Dioxabenzofos, Emamectin, Empenthrin, Epsilon-momfluorothrin, Epsilon-metofluthrin, Esfenvalerate, Ethion, Ethiprole, Etofenprox, Etoxazole, Famphur, Fenazaquin, Fenfluthrin, Fenitrothion, Fenobucarb, Fenothiocarb, Fenoxycarb, Fenpropathrin, Fenpyroxymate, Fensulfothion, Fenthion, Fentinacetate, Fenvalerate, Fipronil, Flometoquin, Flonicamid, Fluacrypyrim, Fluazaindolizine, Fluazuron, Flubendiamide, Flubenzimine, Flucitrinate, Flucycloxuron, Flucythrinate, Fluensulfone, Flufenerim, Flufenprox, Flufiprole, Fluhexafon, Flumethrin, Fluopyram, Flupentiofenox, Flupyradifurone, Flupyrimin, Fluralaner, Fluvalinate, Fluxametamide, Fosthiazate, Gamma-Cyhalothrin, Gossyplure™, Guadipyr, Halofenozide, Halofenprox, Heptafluthrin, Hexythiazox, Hydramethylnon, Imicyafos, Imidacloprid, Imiprothrin, Indoxacarb, Iodomethane, Iprodione, Isocycloseram, Isothioate, Ivermectin, Kappa-bifenthrin, Kappa-tefluthrin, Lambda-Cyhalothrin, Lepimectin, Lufenuron, Metaflumizone, Metaldehyde, Metam, Methomyl, Methoxyfenozide, Metofluthrin, Metolcarb, Mexacarbate, Milbennectin, Momfluorothrin, Niclosamide, Nitenpyram, Nithiazine, Omethoate, Oxamyl, Oxazosulfyl, Parathion-ethyl, Permethrin, Phenothrin, Phosphocarb, Piperonylbutoxide, Pirimicarb, Pirimiphos-ethyl, Prallethrin, Profenofos, Profluthrin, Propargite, Propetamphos, Propoxur, Prothiophos, Protrifenbute, Pyflubumide, Pymetrozine, Pyraclofos, Pyrafluprole, Pyridaben, Pyridalyl, Pyrifluquinazon, Pyrimidifen, Pyrimostrobin, Pyriprole, Pyriproxyfen, Resnnethrin, Sarolaner, Selamectin, Silafluofen, Spinetoram, Spinosad, Spirodiclofen, Spiromesifen, Spiropidion, Spirotetramat, Sulfoxaflor, Tebufenozide, Tebufenpyrad, Tebupirimiphos, Tefluthrin, Temephos, Tetrachloraniliprole, Tetradiphon, Tetramethrin, Tetramethylfluthrin, Tetranactin, Tetraniliprole, Theta-cypermethrin, Thiacloprid, Thiamethoxam, Thiocyclam, Thiodicarb, Thiofanox, Thiometon, Thiosultap, Tioxazafen, Tolfenpyrad, Toxaphene, Tralomethrin, Transfluthrin, Triazamate, Triazophos, Trichlorfon, Trichloronate, Trichlorphon, Triflumezopyrim, Tyclopyrazoflor, Zeta-Cypermethrin, Acibenzolar-S-methyl, Adepidyn, Sedaxane, Oxathiapiprolin, Ipconazole, Metalaxyl, Mefenoxam, Penflufen, Fluxapyroxad, Penthiopyrad, Prothiaconazole, Thiabendazole, Rizolex(Tolclofos-methyl), Carbofuran.

Additional agrochemical active compounds that may be incorporated into the seed treatment composition include, for example, biological agents for pest control, microbial extracts, plant growth activators, and plant defense agents. Non-limiting examples of biological agents include bacteria, fungi, beneficial nematodes, and viruses.

In certain embodiments, the biological agent can comprise a bacterium of the genus Actinomycetes, *Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comamonas, Corynebacterium, Curtobacterium, Enterobacter, Flavobacterium, Gluconobacter, Hydrogenophaga, Klebsiella, Metarhizium, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovorax,* and *Xenorhabdus.* In particular embodiments the bacteria is selected from the group consisting of *Bacillus amyloliquefaciens, Bacillus cereus, Bacillus firmus, Bacillus, lichenformis, Bacillus pumilus, Bacillus sphaericus, Bacillus subtilis, Bacillus thuringiensis, Bradyrhizobium japonicum, Chromobacterium subtsugae, Metarhizium anisopliae, Pasteuria nishizawae, Pasteuria penetrans, Pasteuria usage, Pseudomonas fluorescens,* and *Streptomyces lydicus.*

In certain embodiments the biological agent can comprise a fungus of the genus *Alternaria, Ampelomyces, Aspergillus, Aureobasidium, Beauveria, Colletotrichum, Coniothyrium, Gliocladium, Metarhizium, Muscodor, Paecilomyces, Penicillium, Trichoderma, Typhula, Ulocladium,* and *Verticillium.* In another embodiment the fungus is *Beauveria bassiana, Coniothyrium minitans, Gliocladium vixens, Muscodor albus, Paecilomyces lilacinus, Penicillium bilaiae, Trichoderma asperellum, Trichoderma polysporum,* or *Trichoderma vixens.* In further embodiments the biological agents can comprise harpin, *Reynoutria sachalinensis,* jasmonate, lipochitooligosaccharides, salicylic acid and/or isoflavones. In another embodiment, the biological agent may comprise *Bacillus firmus.* Non-limiting examples of commercially available biological agents include REVV, CUE, QUICK-ROOTS, TORQUE, JUMPSTART, JUMPSTART LCO, ACTINOVATE, VOTIVO, CLARIVA, TAGTEAM, TAGTEAM LCO, OPTIMIZE, RATCHET, PROSTABLISH, NVELOP, SMILAX, CELL TECH, NITRAGIN, NITRAGIN GOLD, and MET 52. Other biological agents include enrofloxacin, febantel, penethamate, moloxicam, cefalexin, kanamycin, pimobendan, clenbuterol, omeprazole, tiamulin, benazepril, pyriprole, cefquinome, florfenicol, buserelin, cefovecin, tulathromycin, ceftiour, carprofen, metaflumizone, praziquarantel, thiabendazole.

Other biological agents include entomopathogenic nematodes, such as *Heterohabditis bacteriophora* or *Steinernema carpocapsae.*

Preferred biological agricultural copmpounds include Azadirachtin, *Bacillus firmus, Beauveria bassiana,* D-limonene, Granulovirus, Harpin, *Helicoverpa armigera* Nucleopolyhedrovirus, *Helicoverpa zea* Nucleopolyhedrovirus, *Heliothis virescens* Nucleopolyhedrovirus, *Heliothis punctigera* Nucleopolyhedrovirus, *Metarhizium* spp., Neem tree based products, *Paecilomyces fumosoroseus, Paecilomyces lilacinus, Pasteuria nishizawae,* P-cymene, *Plutella xylostella* Granulosis virus, *Plutella xylostella* Nucleopolyhedrovirus, Polyhedrosis virus, pyrethrum, Quillaja *Saponaria, Spodoptera frugiperda* Nucleopolyhedrovirus, Terpenoid blend, *Verticillium* spp., *Rhizobium japonimcum, Trichoderma* spp., *Bacillus subtilis,* Nitrogen fixing symbiotic organisms, *Penicillium bilaiae, Trichoderma harzianum rifai, Bacillus licheniformis, Bacillus amyloliquefaciens, Pochonia chlamydosporia,* Chitosan, *Pseudomonas fluorescens, Agrobacterium radiobacter, Metarhizium anisopliae, Cryptophlebia leucotreta* granulovirus (CrleGV), and/or Pine oil.

Examples of suitable additional active ingredients include the following: acycloamino acid,s, aliphatic nitrogen fungicides, amide fungicides, anilide fungicides, antibiotic fungicides, aromatic fungicides, arsenical fungicides, aryl phenyl ketone fungicides, benzamide fungicides, benzanilide fungicides, benzimidazole fungicides, benzothiazole fungicides, botanical fungicides, bridged diphenyl fungicides, carbamate fungicides, carbanilate fungicides, conazole fungicides, copper fungicides, dicarboximide fungicides, dinitrophenol fungicides, dithiocarbamate fungicides, dithiolane fungicides, furamide fungicides, furanilide fungicides, hydrazide fungicides, imidazole fungicides, mercury fungicides, morpholine fungicides, organophosphorous fungicides, organotin fungicides, oxathiin fungicides, oxazole fungicides, phenylsulfamide fungicides, polysulfide fungicides, pyrazole fungicides, pyridine fungicides, pyrimidine fungicides, pyrrole fungicides, quaternary ammonium fungicides, quinoline fungicides, quinone fungicides, quinoxaline fungicides, strobilurin fungicides, sulfonamide fungicides, thiadiazole fungicides, thiazole fungicides, thiazolidine fungicides, thiocarbamate fungicides, thiophene fungicides, triazine fungicides, triazole fungicides, triazolopyrimidine fungicides, urea fungicides, valinamide fungicides, and zinc fungicides. Non-limiting examples of suitable fungicides that may be used as the at least one additional pesticide include 2-(thiocyanatomethylthio)-benzothiazole, 2-phenylphenol, 8-hydroxyquinoline sulfate, *Ampelomyces, quisqualis,* azaconazole, azoxystrobin, *Bacillus subtilis,* benalaxyl, benomyl, benthiavalicarb-isopropyl, benzylaminobenzene-sulfonate (BABS) salt, bicarbonates, biphenyl, bismerthiazol, bitertanol, blasticidin-S, borax, Bordeaux mixture, boscalid, bromuconazole, bupirimate, calcium polysulfide, captafol, captan, carbendazim, carboxin, carpropamid, carvone, chloroneb, chlorothalonil, chlozolinate, *Coniothyrium minitans,* copper hydroxide, copper octanoate, copper oxychloride, copper sulfate, copper sulfate (tribasic), cuprous oxide, cyazofamid, cyflufenarnid, cymoxanil, cyproconazole, cyprodinil, dazomet, debacarb, diammonium ethylenebis-(dithiocarbamate), dichlofluanid, dichlorophen, diclocymet, diclomezine, dichloran, diethofencarb, difenoconazole, difenzoquat ion, diflumetorim, dimethomorph, dimoxystrobin, diniconazole, diniconazole-M, dinobuton, dinocap, diphenylamine, dithianon, dodemorph, dodemorph acetate, dodine, dodine free base, edifenphos, epoxiconazole, ethaboxam, ethoxyquin, etridiazole, famoxadone, fenamidone, fenarimol, fenbuconazole, fenfuram, fenhexamid, fenoxanil, fenpiclonil, fenpropidin, fenpropimorph, fentin, fentin acetate, fentin hydroxide, ferbam, ferimzone, fluazinam, fludioxonil, flumorph, fluopicolide, fluoroimide, fluoxastrobin, fluquinconazole, flusilazole, flusulfamide, flutolanil, flutriafol, folpet, formaldehyde, fosetyl, fosetyl-aluminium, fuberidazole, furalaxyl, furametpyr, guazatine, guazatine acetates, GY-81, hexachlorobenzene, hexaconazole, hymexazol, imazalil, imazalil sulfate, imibenconazole, iminoctadine, iminoctadine triacetate, iminoctadine tris(albesilate), ipconazole, iprobenfos, iprodione, iprovalicarb, isoprothiolane, kasugamycin, kasugamycin hydrochloride hydrate, kresoxim-methyl, mancopper, mancozeb, maneb, mepanipyrim, mepronil, mercuric chloride, mercuric oxide, mercurous chloride, metalaxyl, mefenoxam, metalaxyl-M, metam, metam-ammonium, metam-potassium, metam-sodium, metconazole, methasulfocarb, methyl iodide, methyl isothiocyanate, metiram, metominostrobin, metrafenone, mildiomycin, myclobutanil, nabam, nitrothal-isopropyl, nuarimol, octhilinone, ofurace, oleic acid, in general, fatty acids and salts thereof, in partiuarl potassium salts; orysastrobin, oxadixyl, oxine-copper, oxpoconazole fumarate, oxycarboxin, pefurazoate, penconazole, pencycuron, pentachlorophenol, pentachlorophenyl laurate, penthiopyrad, phenylmercury acetate, phosphonic acid, phthalide, picoxystrobin, polyoxin B, polyoxins, polyoxorim, potassium bicarbonate, potassium hydroxyquinoline sulfate, probenazole, prochloraz, procymidone, propamocarb, propamocarb hydrochloride, propiconazole, propineb, proquinazid, prothioconazole, pyraclostrobin, pyrazophos, pyributicarb, pyrifenox, pyrimethanil, pyroquilon, quinoclamine, quinoxyfen, quintozene, *Reynoutria sachalinensis* extract, silthiofam, simeconazole, sodium 2-phenylphenoxide, sodium bicarbonate, sodium pentachlorophenoxide, spiroxamine, sulfur, SYP-Z071, tar oils, tebuconazole, tecnazene, tetraconazole, thiabendazole, thifluzamide, thiophanate-methyl, thiram, tiadinil, tolclofos-methyl, tolylfluanid, triadimefon, triadimenol, triazoxide, tricyclazole, tridemorph, trifloxystrobin, triflumizole, triforine, triticonazole, validamycin, vinclozolin, zineb, ziram, zoxamide, *Candida oleophila, Fusarium oxysporum, Gliocladium* spp., *Phlebiopsis gigantean, Streptomyces griseoviridis, Trichoderma* spp., (RS)-N-(3,5-dichlorophenyl)-2-(methoxymethyl)-succinimide, 1,2-dichloropropane, 1,3-dichloro-1,1,3,3-tetrafluoroacetone hydrate, 1-chloro-2,4-dinitronaphthalene, 1-chloro-2-nitropropane, 2-(2-heptadecyl-2-imidazolin-1-yl)ethanol, 2,3-dihydro-5-phenyl-1,4-dithi-ine 1,1,4,4-tetraoxide, 2-methoxyethylmercury acetate, 2-methoxyethylmercury chloride, 2-methoxyethylmercury silicate, 3-(4-chlorophenyl)-5-methylrhodanine, 4-(2-nitroprop-1-enyl)phenyl thiocyanateme: ampropylfos, anilazine, azithiram, barium polysulfide, Bayer 3 2394, benodanil, benquinox, bentaluron, benzamacril; benzamacril-isobutyl, benzamorf, binapacryl, bis(methylmercury) sulfate, bis(tributyltin) oxide, buthiobate, cadmium calcium copper zinc chromate sulfate, carbamorph, CECA, chlobenthiazone, chloraniformethan, chlorfenazole, chlorquinox, climbazole, copper bis(3-phenylsalicylate), copper zinc chromate, cufraneb, cupric hydrazinium sulfate, cuprobam, cyclafuramid, cypendazole, cyprofuram, decafentin, dichlone, dichlozoline, diclobutrazol, dimethirimol, dinocton, dinosulfon, dinoterbon, dipyrithione, ditalimfos, dodicin, drazoxolon, EBP, ESBP, etaconazole, etem, ethirim, fenaminosulf, fenapanil, fenitropan, fluotrimazole, furcarbanil, furconazole, furconazole-cis, furmecyclox, furophanate, glyodine, griseofulvin, halacrinate, Hercules 3944, hexylthiofos, ICIA0858, isopamphos, isovaledione, mebenil, mecarbinzid, metazoxolon, methfuroxam, methylmercury dicyandiamide, metsulfovax, milneb, mucochloric anhydride, myclozolin, N-3, 5-dichlorophenyl-succinimide, N-3-nitrophenylitaconimide, natamycin, N-ethylmercurio-4-toluenesulfonanilide, nickel bis(dimethyldithiocarbamate), OCH, phenylmercury dimethyldithiocarbamate, phenylmercury nitrate, phosdiphen, prothiocarb; prothiocarb hydrochloride, pyracarbolid, pyridinitril, pyroxychlor, pyroxyfur, quinacetol; quinacetol sulfate, quinazamid, quinconazole, rabenzazole, salicylanilide, SSF-109, sultropen, tecoram, thiadifluor, thicyofen, thiochlorfenphim, thiophanate, thioquinox, tioxymid, triamiphos, triarimol, triazbutil, trichlamide, urbacid, XRD-563, and zarilamid, and any combinations thereof.

Non-limiting examples of suitable herbicides that may be used as the at least one additional pesticide include amide herbicides such as allidochlor, beflubutamid, benzadox, benzipram, bromobutide, cafenstrole, CDEA, chlorthiamid, cyprazole, dimethenamid, dimethenamid-P, diphenamid, epronaz, etnipromid, fentrazamide, flupoxam, fomesafen, halosafen, isocarbamid, isoxaben, napropamide, naptalam, pethoxamid, propyzamide, quinonamid and tebutam; anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil; arylalanine herbicides, such as benzoylprop, flampropand flamprop-M; chloroacetanilide herbicides, such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor; sulfonanilide herbicides, such as benzofluor, perfluidone, pyrimisulfan and profluazol; sulfonamide herbicides, such as asulam, carbasulam, fenasulam and oryzalin; antibiotic herbicides, such as bilanafos; benzoic acid herbicides, such as chloramben, dicamba, 2,3,6-TBA and tricamba; pyrimidinyloxybenzoic acid herbicides, such as bispyribac and pyriminobac; pyrimidinylthiobenzoic acid herbicides, such as pyrithiobac; phthalic acid herbicides, such as chlorthal; picolinic acid herbicides such as aminopyralid, clopyralid and picloram; quinolinecarboxylic acid herbicides, such as quinclorac and quinmerac; arsenical herbicides, such as cacodylic acid, CMA, DSMA, hexaflurate, MAA, MAMA, MSMA, potassium arsenite and sodium arsenite; benzoylcyclohexanedione herbicides, such as mesotrione, sulcotrione, tefuryltrione and tembotrione; benzofuranyl alkylsulfonate herbicides, such as benfuresate and ethofumesate; carbamate herbicides, such as asulam, carboxazole chlorprocarb, dichlormate, fenasulam, karbutilate and terbucarb; carbanilate herbicides, such as barban, BCPC, carbasulam, carbetamide, CEPC, chlorbufam, chlorpropham, CPPC, desmedipham, phenisopham, phenmedipham, phenmedipham-ethyl, propham and swep; cyclohexene oxime herbicides, such as alloxydim, butroxydim, clethodim, cloproxydim, cycloxydim, profoxydim, sethoxydim, tepraloxydim and tralkoxydim; cyclopropylisoxazole herbicides, such as isoxachlortole and isoxaflutole; dicarboximide herbicides, such as benzfendizone, cinidon-ethyl, flumezin, flumiclorac, flumioxazin and flumipropyn; dinitroaniline herbicides, such as benfluralin, butralin, dinitramine, ethalfluralin, fluchloralin, isopropalin, methalpropalin, nitralin, oryzalin, pendimethalin, prodiamine, profluralin and trifluralin; dinitrophenol herbicides, such as dinofenate, dinoprop, dinosaur, dinoseb, dinoterb, DNOC, etinofen and medinoterb; diphenyl ether herbicides, such as ethoxyfen; nitrophenyl ether herbicides, such as acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen and oxyfluorfen; dithiocarbamate herbicides, such as dazomet and metam; halogenated aliphatic herbicides, such as alorac, chloropon, dalapon, flupropanate, hexachloroacetone, iodomethane, methyl bromide, monochloroacetic acid, SMA and TCA; imidazolinone herbicides, such as imazamethabenz, imazamox, imazapic, imazapyr, imazaquin and imazethapyr; inorganic herbicides, such as ammonium sulfamate, borax, calcium chlorate, copper sulfate, ferrous sulfate, potassium azide, potassium cyanate, sodium azide, sodium chlorate and sulfuric acid; nitrile herbicides, such as bromobonil, bromoxynil, chloroxynil, dichlobenil, iodobonil, ioxynil and pyraclonil; organophosphorus herbicides, such as amiprofos-methyl, anilofos, bensulide, bilanafos, butamifos, 2,4-DEP, DM PA, EBEP, fosamine, glufosinate, glyphosate and piperophos; phenoxy herbicides, such as bromofenoxim, clomeprop, 2,4-DEB, 2,4-DEP, difenopenten, disul, erbon, etnipromid, fenteracol and trifopsime; phenoxyacetic herbicides, such as 4-CPA, 2,4-D, 3,4-DA, MCPA, MCPA-thioethyl and 2,4,5-T; phenoxybutyric herbicides, such as 4-CPB, 2,4-DB, 3,4-DB, MCPB and 2,4,5-TB; phenoxypropionic herbicides, such as cloprop, 4-CPP, dichlorprop, dichlorprop-P, 3,4-DP, fenoprop, mecopropand mecoprop-P; aryloxyphenoxypropionic herbicides, such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop; phenylenediamine herbicides, such as dinitramine and prodiamine; pyrazolyl herbicides, such as benzofenap, pyrazolynate, pyrasulfotole, pyrazoxyfen, pyroxasulfone and topramezone; pyrazolylphenyl herbicides, such as fluazolate and pyraflufen; pyridazine herbicides, such as credazine, pyridafol and pyridate; pyridazinone herbicides, such as brompyrazon, chloridazon, dimidazon, flufenpyr, metflurazon, norflurazon, oxapyrazon and pydanon; pyridine herbicides such as aminopyralid, cliodinate, clopyralid, dithiopyr, fluoroxypyr, haloxydine, picloram, picolinafen, pyriclor, thiazopyr and triclopyr; pyrimidinediamine herbicides, such as iprymidam and tioclorim; quaternary ammonium herbicides, such as cyperquat, diethamquat, difenzoquat, diquat, morfamquat and paraquat; thiocarbamate herbicides, such as butylate, cycloate, di-allate, EPIC, esprocarb, ethiolate, isopolinate, methiobencarb, molinate, orbencarb, pebulate, prosulfocarb, pyributicarb, sulfallate, thiobencarb, tiocarbazil, tri-allate and vemolate; thiocarbonate herbicides, such as dimexano, EXD and proxan; thiourea herbicides such as methiuron; triazine herbicides, such as dipropetryn, triaziflam and trihydroxytriazine; chlorotriazine herbicides, such as atrazine, chlorazine, cyanazine, cyprazine, eglinazine, ipazine, mesoprazine, procyazine, proglinazine, propazine, sebuthylazine, simazine, terbuthylazine and trietazine; methoxytriazine herbicides, such as atraton, methometon, prometon, secbumeton, simeton and terbumeton; methylthiotriazine herbicides, such as ametryn, aziprotryne, cyanatryn, desmetryn, dimethametryn, methoprotryne, prometryn, simetryn and terbutryn; triazinone herbicides, such as ametridione, amibuzin, hexazinone, isomethiozin, metamitron and metribuzin; triazole herbicides, such as amitrole, cafenstrole, epronaz and flupoxam; triazolone herbicides, such as amicarbazone, bencarbazone, carfentrazone, flucarbazone, propoxycarbazone, sulfentrazone and thiencarbazone-methyl; triazolopyrimidine herbicides, such as cloransulam, diclosulam, florasulam, flumetsulam, metosulam, penoxsulam and pyroxsulam; uracil herbicides, such as butafenacil, bromacil, flupropacil, isocil, lenacil and terbacil; 3-phenyluracils; urea herbicides, such as benzthiazuron, cumyluron, cycluron, dichloralurea, diflufenzopyr, isonoruron, isouron, methabenzthiazuron, monisouron and noruron; phenylurea herbicides, such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluoron, phenobenzuron, siduron, tetrafluoron and thidiazuron; pyrimidinylsulfonylurea herbicides, such as amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron; triazinylsulfonylurea herbicides, such as chlorsulfuron, cinosulfuron, ethametsulfuron, iodosulfuron, metsulfuron, prosulfuron, thifensulfuron, triasulfuron, tribenuron, triflusulfuron and tritosulfuron; thiadiazolylurea herbicides, such as buthiuron, ethidimuron, tebuthiuron, thiazafluoron and thidiazuron; and unclassified herbicides such as acrolein, allyl alcohol, azafenidin, benazolin, bentazone, benzobicyclon, buthidazole, calcium cyanamide, cambendichlor, chlorfenac, chlorfenprop, chlorflurazole, chlorflurenol, cinmethylin, clomazone, CPMF, cresol, ortho-dichlorobenzene, dimepiperate, endothal, fluoromidine, fluridone, fluorochloridone, flurtamone, fluthiacet, indanofan, methazole, methyl isothiocyanate, nipyraclofen, OCH, oxadiargyl, oxadiazon, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan, and tritac.

Non-limiting examples of suitable additional active ingredients also include the following:

3-difluoromethyl-1-methyl-1H-pyrazole-4-carboxylic acid (9-dichloromethylene-1,2,3,4-tetrahydro-1,4-methano-naphthalen-5-yl)-amide, 3-difluoromethyl-1-methyl-1H-pyrazole-4-carboxylic acid methoxy-[1-methyl-2-(2,4,6-trichlorophenyl)-ethyl]-amide, 1-methyl-3-difluoromethyl-1H-pyrazole-4-carboxylic acid (2-dichloromethylene-3-ethyl-1-methyl-indan-4-yl)-amide (1072957-71-1), 1-methyl-3-difluoromethyl-1 H-pyrazole-4-carboxylic acid (4'-methylsulfanyl-biphenyl-2-yl)-amide, 1-methyl-3-difluoromethyl-4H-pyrazole-4-carboxylic acid [2-(2,4-dichloro-phenyl)-2-methoxy-1-methyl-ethyl]-amide, (5-Chloro-2,4-dimethyl-pyridin-3-y1)-(2,3,4-trinnethoxy-6-methyl-phenyl)-methanone, (5-Bromo-4-chloro-2-methoxy-pyridin-3-yl)-(2,3,4-trimethoxy-6-methyl-phenyl)-methanone, 2-{2-[(E)-3-(2,6-Dichloro-phenyl)-1-methyl-prop-2-en-(E)-ylideneaminooxymethyl]-phenyl}-2-[(Z)-methoxyimino]-N-methyl-acetamide, 3-[5-(4-Chloro-phenyl)-2,3-dimethyl-isoxazolidin-3-yl]-pyridine, (E)-N-methyl-2-[2-(2, 5-dimethylphenoxymethyl)phenyl]-2-methoxy-iminoacetamide, 4-bromo-2-cyano-N,N-dimethyl-6-trifluoromethylbenzimidazole-1-sulphonamide, a-[N-(3-chloro-2, 6-xylyl)-2-methoxyacetamido]-y-butyrolactone, 4-chloro-2-cyano-N,N-dimethyl-5-p-tolylimidazole-1-sulfonamide, N-allyl-4, 5,-dimethyl-2-trimethylsilylthiophene-3-carboxamide, N-(1-cyano-1, 2-d i methyl p ropy l)-2-(2, 4-dichlorophenoxy) propionamide, N-(2-methoxy-5-pyridyl)-cyclopropane carboxamide, (.+-.)-cis-1-(4-chlorophenyl)-2-(1 H-1,2,4-triazol-1-yl)-cycloheptanol, 2-(1-ieri-butyl)-1-(2-chlorophenyl)-3-(1,2,4-triazol-1-yl)-propan-2-ol, 2 6'-dibromo-2-methyl-4-trifluoromethoxy-4'-trifluoromethyl-1,3-thiazole-5-carboxanilide, 1-imidazolyl-1-(4'-chlorophenoxy)-3,3-dimethylbutan-2-one, methyl(E)-2-[2-[6-(2-cyanophenoxy)pyrimidin-4-yloxy] phenyl]3-methoxyacrylate, methyl(E)-2-[2-[6-(2-thioamidophenoxy)pyrimidin-4-yloxy]phenyl]-3-methoxyacrylate, methyl(E)-2-[2-[6-(2-fluorophenoxy) pyrimidin-4-yloxy]phenyl]-3-methoxyacrylate, methyl(E)-2-[2-[6-(2,6-difluorophenoxy)pyrimidin-4-yloxy]phenyl]-3-methoxyacrylate, methyl(E)-2-[2-[3-(pyrimidin-2-yloxy) phenoxy]phenyl]-3-methoxyacrylate, methyl(E)-2-[2-[3-(5-methylpyrimidin-2-yloxy)-phenoxy]phenyl]-3-methoxyacrylate, methyl(E)-2-[2-[3-(phenyl-sulphonyloxy) phenoxy]phenyl-3-methoxyacrylate, methyl(E)-2-[2-[3-(4-nitrophenoxy)phenoxy]phenyl]-3-methoxyacrylate, methyl (E)-2-[2-phenoxyphenyl]-3-methoxyacrylate, methyl(E)-2-[2-(3,5-dimethyl-benzoyl)pyrrol-1-yl]-3-methoxyacrylate, methyl(E)-2-[2-(3-methoxyphenoxy)phenyl]-3-methoxy-acrylate, methyl(E)-2-[2-(2-phenylethen-1-yl)-phenyl]-3-methoxyacrylate, methyl(E)-2-[2-(3,5-dichlorophenoxy) pyridin-3-yl]-3-methoxyacrylate, methyl(E)-2-(2-(3-(1,1,2, 2-tetrafluoroethoxy)phenoxy)phenyl)-3-methoxyacrylate, methyl(E)-2-(2-[3-(alpha-hydroxybenzyl)phenoxy]phenyl)-3-methoxyacrylate, methyl(E)-2-(2-(4-phenoxypyridin-2-yloxy)phenyl)-3-methoxyacrylate, methyl(E)-2-[2-(3-n-propyloxy-phenoxy)phenyl]3-methoxyacrylate, methyl(E)-2-[2-(3-isopropyloxyphenoxy)phenyl]-3-methoxyacrylate, methyl(E)-2-[2-[3-(2-fluorophenoxy)phenoxy]phenyl]-3-methoxyacrylate, methyl(E)-2-[2-(3-ethoxyphenoxy)phenyl]-3-methoxyacrylate, methyl(E)-2-[2-(4-ieri-butyl-pyridin-2-yloxy)phenyl]-3-methoxyacrylate, methyl(E)-2-[2-[3-(3-cyanophenoxy)phenoxy]phenyl]-3-methoxyacrylate, methyl(E)-2-[2-[(3-methyl-pyridin-2-yloxymethyl)phenyl]-3-methoxyacrylate, methyl(E)-2-[2-[6-(2-methyl-phenoxy) pyrimidin-4-yloxy]phenyl]-3-methoxyacrylate, methyl(E)-2-[2-(5-bromo-pyridin-2-yloxymethyl)phenyl]-3-methoxyacrylate, methyl(E)-2-[2-(3-(3-iodopyridin-2-yloxy)phenoxy)phenyl]-3-methoxyacrylate, methyl(E)-2-[2-[6-(2-chloropyridin-3-yloxy)pyrimidin-4-yloxy]phenyl]-3-nnethoxyac rylate, methyl(E),(E)-2-[2-(5,6-dimethylpyrazin-2-yImethyloximinomethyl)phenyl]-3-methoxyacrylate, methyl(E)-2-{2-[6-(6-methylpyridin-2-yloxy)pyrimidin-4-yloxy]phenyl}-3-methoxy-acrylate, methyl(E),(E)-2-{2-(3-methoxyphenyl)methyloximinomethyl]-phenyl1-3-methoxyacrylate, methyl(E)-2-{2-(6-(2-azidophenoxy)-pyrimidin-4-yloxy]phenyl}-3-methoxyacrylate, methyl(E),(E)-2-{2-[6-phenylpyrimidin-4-yl)-methyloximino-methyl]phenyl1-3-methoxyacrylate, methyl (E),(E)-2-1 2-[(4-chlorophenyl)-methyloximinomethyl]-phenyl}-3-methoxyacryl ate, methyl(E)-2-{2-[6-(2-n-propylphenoxy)-1,3,5-triazin-4-yloxy]phenyl}-1-3-methoxyacrylate, methyl(E),(E)-2-{2-[(3-nitrophenyl) methyloximinomethyl]phenyl}-1-3-methoxyacrylate, 3-chloro-7-(2-aza-2,7,7-trimethyl-oct-3-en-5-ine), 2,6-dichloro-N-(4-trifluoromethylbenzyl)-benzamide, 3-iodo-2-propinyl alcohol, 4-chlorophenyl-3-iodopropargyl formal, 3-bromo-2,3-diiodo-2-propenyl ethylcarbamate, 2,3,3-triiodoallyl alcohol, 3-bromo-2,3-diiodo-2-propenyl alcohol, 3-iodo-2-propinyl n-butylcarbamate, 3-iodo-2-propinyl n-hexylcarbamate, 3-iodo-2-propinyl cyclohexyl-carbamate, 3-iodo-2-propinyl phenylcarbamate; phenol derivatives, such as tribromophenol, tetrachlorophenol, 3-methyl-4-chlorophenol, 3,5-dimethyl-4-chlorophenol, phenoxyethanol, dichlorophene, o-phenylphenol, m-phenylphenol, p-phenylphenol, 2-benzyl-4-chlorophenol, 5-hydroxy-2 (5H)-furanone; 4,5-dichlorodithiazolinone, 4,5-benzodithiazolinone, 4,5-trimethylenedithiazolinone, 4,5-dichloro-(3H)-1,2-dithiol-3-one, 3,5-dimethyl-tetrahydro-1,3,5-thiadiazine-2-thione, N-(2-p-chlorobenzoylethyl)-hexaminium chloride, acibenzolar, acypetacs, alanycarb, albendazole, aldimorph, allicin, allyl alcohol, ametoctradin, amisulbrom, amobam, ampropylfos, anilazine, asomate, aureofungin, azaconazole, azafendin, azithiram, azoxystrobin, barium polysulfide, benalaxyl, benalaxyl-M, benodanil, benomyl, benquinox, bentaluron, benthiavalicarb, benthiazole, benzalkonium chloride, benzamacril, benzamorf, benzohydroxamic acid, benzovindiflupyr, berberine, bethoxazin, biloxazol, binapacryl, biphenyl, bitertanol, bithionol, bixafen, blasticidin-S, boscalid, bromothalonil, bromuconazole, bupirimate, buthiobate, butylamine calcium polysulfide, captafol, captan, carbamorph, carbendazim, carbendazim chlorhydrate, carboxin, carpropamid, carvone, CGA41396, CGA41397, chinomethionate, chitosan, chlobenthiazone, chloraniformethan, chloranil, chlorfenazole, chloroneb, chloropicrin, chlorothalonil, chlorozolinate, chlozolinate, climbazole, clotrimazole, clozylacon, copper containing compounds such as copper acetate, copper carbonate, copper hydroxide, copper naphthenate, copper oleate, copper oxychloride, copper oxyquinolate, copper silicate, copper sulphate, copper tallate, copper zinc chromate and Bordeaux mixture, cresol, cufraneb, cuprobam, cuprous oxide, cyazofamid, cyclafuramid, cycloheximide, cyflufenamid, cymoxanil, cypendazole, cyproconazole, cyprodinil, dazomet, debacarb, decafentin, dehydroacetic acid, di-2-pyridyl disulphide 1,1'-dioxide, dichlofluanid, diclomezine, dichlone, dicloran, dichlorophen, dichlozoline, diclobutrazol, diclocymet, diethofencarb, difenoconazole, difenzoquat, diflumetorim, 0-di-iso-propyl-S-benzyl thiophosphate, dimefluazole, dimetachlone, dimetconazole, dimethomorph, dimethirimol, diniconazole, diniconazole-M, dinobuton, dinocap, dinocton, dinopenton, dinosulfon, dinoterbon, diphenylamine, dipyrithione, disulfiram, ditalimfos, dithianon, dithioether, dodecyl dimethyl ammonium chloride, dodemorph, dodicin, dodine, doguadine, drazoxolon, edifenphos, enestroburin, epoxiconazole, etaconazole, etem, ethaboxam, ethirimol, ethoxyquin, ethilicin, ethyl(Z)-N-benzyl-N([methyl(methyl-thioethylideneamino-oxycarbonyl)amino] thio)^-alaninate, etridiazole, famoxadone, fenamidone, fenaminosulf, fenapanil, fenarimol, fenbuconazole, fenfuram, fenhexamid, fenitropan, fenoxanil, fenpiclonil, fenpicoxamid, fenpropidin, fenpropimorph, fenpyrazamine, fentin acetate, fentin hydroxide, ferbam, ferimzone, fluazinam, fludioxonil, flumetover, flumorph, flupicolide, fluopyram, fluoroimide, fluotrimazole, fluoxastrobin, fluquinconazole, flusilazole, flusulfamide, flutanil, flutolanil, flutriafol, fluxapyroxad, folpet, formaldehyde, fosetyl, fuberidazole, furalaxyl, furametpyr, furcarbanil, furconazole, furfural, furmecyclox, furophanate, glyodin, griseofulvin, guazatine, halacrinate, hexa chlorobenzene, hexachlorobutadiene, hexachlorophene, hexaconazole, hexylthiofos, hydrargaphen, hydroxyisoxazole, hymexazole, imazalil, imazalil sulphate, imibenconazole, iminoctadine, iminoctadine triacetate, inezin, iodocarb, ipconazole, ipfentrifluconazole, iprobenfos, iprodione, iprovalicarb, isopropanyl butyl carbamate, isoprothiolane, isopyrazam, isotianil, isovaledione, izopamfos, kasugamycin, kresoxim-methyl, LY186054, LY211795, LY248908, mancozeb, mandipropamid, maneb, mebenil, mecarbinzid, mefenoxam, mefentrifluconazole, mepanipyrim, mepronil, mercuric chloride, mercurous chloride, meptyldinocap, metalaxyl, metalaxyl-M, metam, metazoxolon, metconazole, methasulfocarb, methfuroxam, methyl bromide, methyl iodide, methyl isothiocyanate, metiram, metiram-zinc, metominostrobin, metrafenone, metsulfovax, milneb, moroxydine, myclobutanil, myclozolin, nabam, natamycin, neoasozin, nickel dimethyldithiocarbamate, nitrostyrene, nitrothalisopropyl, nuarimol, octhilinone, ofurace, organomercury compounds, orysastrobin, osthol, oxadixyl, oxasulfuron, oxathiapiprolin, oxine-copper, oxolinic acid, oxpoconazole, oxycarboxin, parinol, pefurazoate, penconazole, pencycuron, penflufen, pentachlorophenol, penthiopyrad, phenamacril, phenazin oxide, phosdiphen, phosetyl-Al, phosphorus acids, phthalide, picoxystrobin, piperalin, polycarbamate, polyoxin D, polyoxrim, polyram, probenazole, prochloraz, procymidone, propamidine, propamocarb, propiconazole, propineb, propionic acid, proquinazid, prothiocarb, prothioconazole, pydiflumetofen, pyracarbolid, pyraclostrobin, pyrametrostrobin, pyraoxystrobin, pyrazophos, pyribencarb, pyridinitril, pyrifenox, pyrimethanil, pyriofenone, pyroquilon, pyroxychlor, pyroxyfur, pyrrolnitrin, quaternary ammonium compounds, quinacetol, quinazamid, quinconazole, quinomethionate, quinoxyfen, quintozene, rabenzazole, santonin, sedaxane, silthiofam, simeconazole, sipconazole, sodium pentachlorophenate, spiroxamine, streptomycin, sulphur, sultropen, tebuconazole, tebfloquin, tecloftalam, tecnazene, tecoram, tetraconazole, thiabendazole, thiadifluor, thicyofen, thifluzamide, 2-(thiocyanomethylthio) benzothiazole, thiophanate-methyl, thioquinox, thiram, tiadinil, timibenconazole, tioxymid, tolclofos-methyl, tolylfluanid, triadimefon, triadimenol, triamiphos, triarimol, triazbutil, triazoxide, tricyclazole, tridemorph, trifloxystrobin, triflumazole, triforine, triflumizole, triticonazole, uniconazole, urbacide, validamycin, valifenalate, vapam, vinclozolin, zarilamid, zineb, ziram, and zoxamide.

The agricultural compounds useful in the dressings applied according to the invention may also be used in combination with anthelmintic agents. Such anthelmintic agents include, compounds selected from the macrocyclic lactone class of compounds such as ivermectin, avermectin, abamectin, emamectin, eprinomectin, doramectin, selamectin, moxidectin, nemadectin and milbemycin derivatives as described in EP-357460, EP-444964 and EP-594291. Additional anthelmintic agents include semisynthetic and biosynthetic avermectin/milbemycin derivatives such as those described in U.S. Pat. No. 5,015,630, WO-9415944 and WO-9522552. Additional anthelmintic agents include the benzimidazoles such as albendazole, cambendazole, fenbendazole, flubendazole, mebendazole, oxfendazole, oxibendazole, parbendazole, and other members of the class. Additional anthelmintic agents include imidazothiazoles and tetrahydropyrimidines such as tetramisole, levamisole, pyrantel pamoate, oxantel or morantel. Additional anthelmintic agents include flukicides, such as triclabendazole and clorsulon and the cestocides, such as praziquantel and epsiprantel.

The compounds of the invention may be used in combination with derivatives and analogues of the paraherquamide/marcfortine class of anthelmintic agents, as well as the antiparasitic oxazolines such as those disclosed in U.S. Pat. Nos. 5,478,855, 4,639,771 and DE-19520936.

Non-limiting examples of suitable additional active ingredients also include the following: derivatives and analogues of the general class of dioxomorpholine antiparasitic agents as described in WO 96/15121 and also with anthelmintic active cyclic depsipeptides such as those described in WO 96/11945, WO 93/19053, WO 93/25543, EP 0 6 26 375, EP 0 382 173, WO 94/19334, EP 0 382 173, and EP 0 503 538. The compounds of the invention may be used in combination with other ectoparasiticides; for example, fipronil; pyrethroids; organophosphates; insect growth regulators such as lufenuron; ecdysone agonists such as tebufenozide and the like; neonicotinoids such as imidacloprid and the like.

The compounds of the invention may be used in combination with terpene alkaloids, for example those described in International Patent Application Publication Numbers WO 95/19363 or WO 04/72086, particularly the compounds disclosed therein.

Other examples of such biologically active agricultural compounds that may be used in combination with include but are not restricted to the following: Organophosphates include acephate, azamethiphos, azinphos-ethyl, azinphos-methyl, bromophos, bromophos-ethyl, cadusafos, chlorethoxyphos, chlorpyrifos, chlorfenvinphos, chlormephos, demeton, demeton-S-methyl, demeton-S-methyl sulphone, dialifos, diazinon, dichlorvos, dicrotophos, dimethoate, disulfoton, ethion, ethoprophos, etrimfos, famphur, fenamiphos, fenitrothion, fensulfothion, fenthion, flupyrazofos, fonofos, formothion, fosthiazate, heptenophos, isazophos, isothioate, isoxathion, malathion, methacriphos, methamidophos, methidathion, methyl-parathion, mevinphos, monocrotophos, naled, omethoate, oxydemeton-methyl, paraoxon, parathion, parathion-methyl, phenthoate, phosalone, phosfolan, phosphocarb, phosmet, phosphamidon, phorate, phoxim, pirimiphos, pirimiphosmethyl, profenofos, propaphos, proetamphos, prothiofos, pyraclofos, pyridapenthion, quinalphos, sulprophos, temephos, terbufos, tebupirimfos, tetrachlorvinphos, thimeton, triazophos, trichlorfon, vamidothion. Exemplary additional carbamates include alanycarb, aldicarb, 2-sec-butylphenyl methylcarbamate, benfuracarb, carbaryl, carbofuran, carbosulfan, cloethocarb, ethiofencarb, fenoxycarb, fenthiocarb, furathiocarb, HCN-801, isoprocarb, indoxacarb, methiocarb, methomyl, 5-methyl-m-cumenylbutyryl(methyl)carbamate, oxamyl, pirimicarb, propoxur, thiodicarb, thiofanox, triazamate, UC-51717. Exemplary additional pyrethroids may include acrinathin, allethrin, alphametrin, 5-benzyl-3-furylmethyl(E)-(1R)-cis-2,2-dimethyl-3-(2-oxothiolan-3-ylidenemethyl)cyclopropanecarboxylate, bifenthrin, beta-cyfluthrin, cyfluthrin, a-cypermethrin, beta-cypernnethrin, bioallethrin, bioallethrin((S)-cyclopentylisomer), bioresmethrin, bifenthrin, NCI-85193, cycloprothrin, cyhalothrin, cythithrin, cyphenothrin, deltannethrin, empenthrin, esfenvalerate, ethofenprox, fenfluthrin, fenpropathrin, fenvalerate, flucythrinate, flumethrin, fluvalinate (D isomer), imiprothrin, cyhalothrin, lambda-cyhalothrin, permethrin, phenothrin, prallethrin, pyrethrins (natural products), resmethrin, tetramethrin, transfluthrin, theta-cypermethrin, silafluofen, t-fluvalinate, tefluthrin, tralomethrin, and Zeta-cypermethrin.

Exemplary additional arthropod growth regulators may include a) chitin synthesis inhibitors: benzoylureas: chlorfluazuron, diflubenzuron, fluazuron, flucycloxuron, flufenoxuron, hexaflumuron, lufenuron, novaluron, teflubenzuron, triflumuron, buprofezin, diofenolan, hexythiazox, etoxazole, chlorfentazine; b) ecdysone antagonists: halofenozide, methoxyfenozide, tebufenozide; c) juvenoids: pyriproxyfen, methoprene (including S-methoprene), fenoxycarb; d) lipid biosynthesis inhibitors: spirodiclofen.

Other exemplary additional antiparasitic compounds may include acequinocyl, amitraz, AKD-1022, ANS-1 18, azadirachtin, bensultap, bifenazate, binapacryl, bromopropylate, BTG-504, BTG-505, camphechlor, cartap, chlorobenzilate, chlordimeform, chlorfenapyr, chromafenozide, clothianidin, cyromazine, diacloden, diafenthiuron, DBI-3 204, dinactin, dihydroxymethyldihydroxypyrrolidine, dinobuton, dinocap, endosulfan, ethiprole, ethofenprox, fenazaquin, fluorite, MTI-800, fenpyroximate, fluacrypyrim, flubenzimine, flubrocythrinate, flufenzine, flufenprox, fluproxyfen, halofenprox, hydramethylnon, IKI-2 20, kanemite, NC-196, neem guard, nidinorterfuran, nitenpyram, SD-35651, WL-108477, pirydaryl, propargite, protrifenbute, pymethrozine, pyridaben, pyrimidifen, NC-1 1 1 1, R-195,RH-0345, RH-2485, RYI-210, S-1 283, S-1833, SI-8601, silafluofen, silomadine, spinosad, tebufenpyrad, tetradifon, tetranactin, thiacloprid, thiocyclam, thiamethoxam, tolfenpyrad, triazamate, triethoxyspinosyn, trinactin, verbutin, vertalec, YI-5301. The at least one 2,4-(substituted aromatic)-1,3-oxazoline compound and the at least one additional pesticide may, for example, be present in a weight ratio of from about 1:100 to about 100:1. Additional insecticide compound may be used for the same pesticidal activity as the at least one 2,4-(substituted aromatic)-1,3-oxazoline compound (e.g., to control insects of a particular Order, Family, Genus, Species, etc.), or may be used for a different pesticidal activity (e.g., to control insects of a different Order, Family, Genus, Species, etc.). Non-limiting examples of suitable insecticides that may be used as the at least one additional pesticide include: antibiotic insecticides, such as allosamidin and thuringiensin; macrocyclic lactone insecticides, such as spinosad, spinetoram, and other spinosyns including the 21-butenyl spinosyns and their derivatives; avermectin insecticides, such as abamectin, doramectin, emamectin, eprinomectin, ivermectin and selamectin; milbemycin insecticides, such as lepimectin, milbemectin, milbemycin oxime and moxidectin; arsenical insecticides, such as calcium arsenate, copper acetoarsenite, copper arsenate, lead arsenate, potassium arsenite and sodium arsenite; biological insecticides such as *Bacillus popilliae, B. sphaericus, B. thuringiensis* subsp. *aizawai, B. thuringiensis* subsp. kurstaki, *B. thuringiensis* subsp. tenebrionis, *Beauveria bassiana, Cydia pomonella* granulosis virus; *Bacillus thuringiensis* delta endotoxin, baculovirus, entomopathogenic bacteria, virus and fungi; Douglas fir tussock moth NPV, gypsy moth NPV, *Helicoverpa zea* NPV, Indian meal moth granulosis virus, *Metarhizium* anisopliae, *Nosema locustae, Paecilomyces fumosoroseus, P. lilacinus, Photorhabdus luminescens, Spodoptera exigua* NPV, trypsin modulating oostatic factor, Xenorhabdus *nematophilus*, and X. bovienii, plant incorporated protectant insecticides such as Cry1Ab, Cry1Ac, Cry1F, Cry1A.105, Cry2Ab2, Cry3A, mir Cry3A, Cry3Bb1, Cry34, Cry35, and VIP3A; botanical insecticides, such as anabasine, azadirachtin, d-limonene, nicotine, pyrethrins, cinerins, cinerin I, cinerin II, jasmolin I, jasmolin II, pyrethrin I, pyrethrin II, quassia, rotenone, ryania and sabadilla; carbamate insecticides such as bendiocarb and carbaryl; benzofuranyl methylcarbamate insecticides, such as benfuracarb, carbofuran, carbosulfan, decarbofuran and furathiocarb; dimethylcarbamate insecticides dimitan, dimetilan, hyquincarb and pirimicarb; oxime carbamate insecticides, such as alanycarb, aldicarb, aldoxycarb, butocarboxim, butoxycarboxim, methomyl, nitrilacarb, oxamyl, tazimcarb, thiocarboxime, thiodicarb and thiofanox; phenyl methylcarbamate insecticides, such as allyxycarb, aminocarb, bufencarb, butacarb, carbanolate, cloethocarb, dicresyl, dioxacarb, EM PC, ethiofencarb, fenethacarb, fenobucarb, isoprocarb, methiocarb, metolcarb, mexacarbate, promacyl, promecarb, propoxur, trimethacarb, XMC and xylylcarb; dinitrophenol insecticides, such as dinex, dinoprop, dinosaur and DNOC; fluorine insecticides, such as barium hexafluorosilicate, cryolite, sodium fluoride, sodium hexafluorosilicate and sulfluramid; formamidine insecticides, such as amitraz, chlordimeform, formetanate and formparanate; fumigant insecticides, such as acrylonitrile, carbon disulfide, carbon tetrachloride, chloroform, chloropicrin, para-dichlorobenzene, 1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride and tetrachloroethane; inorganic insecticides, such as borax, calcium polysulfide, copper oleate, mercurous chloride, potassium thiocyanate and sodium thiocyanate; chitin synthesis inhibitors such as bistrifluoron, buprofezin, chlorfluazuron, cyromazine, diflubenzuron, flucycloxuron, flufenoxuron, hexaflumuron, lufenuron, novaluron, noviflumuron, penfluoron, teflubenzuron and triflumuron; juvenile hormone mimics, such as epofenonane, fenoxycarb, hydroprene, kinoprene, methoprene, pyriproxyfen and triprene; juvenile hormones such as juvenile hormone I, juvenile hormone II and juvenile hormone III; moulting hormone agonists, such as chromafenozide, halofenozide, methoxyfenozide and tebufenozide; moulting hormones such as α-ecdysone and ecdysterone; moulting inhibitors, such as diofenolan; precocenes, such as precocene I, precocene II and precocene III; unclassified insect growth regulators, such as dicyclanil; nereistoxin analogue insecticides, such as bensultap, cartap, thiocyclam and thiosultap; nicotinoid insecticides, such as flonicamid; nitroguanidine insecticides, such as clothianidin, dinotefuran, imidacloprid and thiamethoxam; aminofuranone neonicotinoids such as BYI-0 2960; semisynthetic fermentation products such as cypropen; nitromethylene insecticides, such as nitenpyram and nithiazine; pyridylmethylamine insecticides, such as acetamiprid, imidacloprid, nitenpyram and thiacloprid; organochlorine insecticides, such as bromo-DDT, camphechlor, DDT, pp'-DDT, ethyl-DDD, HCH, gamma-HCH, lindane, methoxychlor, pentachlorophenol and IDE; cyclodiene insecticides such as aldrin, bromocyclen, chlorbicyclen, chlordane, chlordecone, dieldrin, dilor, endosulfan, endrin, HEOD, heptachlor, HHDN, isobenzan, isodrin, kelevan and mirex; organophosphate insecticides, such as bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP and tetrachlorvinphos; organothiophosphate insecticides, such as dioxabenzofos, fosmethilan and phenthoate; aliphatic organothiophosphate insecticides, such as acethion, amiton, cadusafos, chlorethoxyfos, chlormephos, demephion, demephion-O, demephion-S, demeton, demeton-O, demeton-S, demeton-methyl, demeton-O-methyl, demeton-S-methyl, demeton-S-methylsulphon, disulfoton, ethion, ethoprophos, IPSP, isothioate, malathion, methacrifos, oxydemetonmethyl, oxydeprofos, oxydisulfoton, phorate, sulfotep, terbufos and thiometon; aliphatic amide organothiophosphate insecticides, such as amidithion, cyanthoate, dimethoate, ethoate-methyl, formothion, mecarbam, omethoate, prothoate, sophamide and vamidothion; oxime organothiophosphate insecticides, such as chlorphoxim, phoxim and phoxim-methyl; heterocyclic organothiophosphate insecticides, such as azamethiphos, coumaphos, coumithoate, dioxathion, endothion, menazon, morphothion, phosalone, pyraclofos, pyridaphenthion and quinothion; benzothiopyran organothiophosphate insecticides, such as dithicrofos and thicrofos; benzotriazine organothiophosphate insecticides such as azinphos-ethyl and azinphos-methyl; isoindole organothiophosphate insecticides, such as dialifos and phosmet; isoxazole organothiophosphate insecticides, such as isoxathion and zolaprofos; pyrazolopyrimidine organothiophosphate insecticides, such as chlorprazophos and pyrazophos; pyridine organothiophosphate insecticides, such as chlorpyrifos and chlorpyrifos-methyl; pyrimidine organothiophosphate insecticides, such as butathiofos, diazinon, etrimfos, lirimfos, pirimiphos-ethyl, pirimiphos-methyl, primidophos, pyrimitate and tebupirimfos; quinoxaline organothiophosphate insecticides, such as quinalphos and quinalphos-methyl; thiadiazole organothiophosphate insecticides, such as athidathion, lythidathion, methidathion and prothidathion; triazole organothiophosphate insecticides, such as isazofos and triazophos; phenyl organothiophosphate insecticides, such as azothoate, bromophos, bromophos-ethyl, carbophenothion, chlorthiophos, cyanophos, cythioate, dicapthon, dichlofenthion, etaphos, famphur, fenchlorphos, fenitrothion fensulfothion, fenthion, fenthionethyl, heterophos, jodfenphos, mesulfenfos, parathion, parathion-methyl, phenkapton, phosnichlor, profenofos, prothiofos, sulprofos, temephos, trichlormetaphos-3 and trifenofos; phosphonate insecticides, such as butonate and trichlorfon; phosphonothioate insecticides, such as mecarphon; phenyl ethylphosphonothioate insecticides, such as fonofos and trichloronat; phenyl phenylphosphonothioate insecticides, such as cyanofenphos, EPN and leptophos; phosphoramidate insecticides such as crufomate, fenamiphos, fosthietan, mephosfolan, phosfolan and pirimetaphos; phosphoramidothioate insecticides such as acephate, isocarbophos, isofenphos, methamidophos and propetamphos; phosphorodiamide insecticides, such as dimefox, mazidox, mipafox and schradan; oxadiazine insecticides, such as indoxacarb; phthalimide insecticides, such as dialifos, phosmet and tetramethrin; pyrazole insecticides, such as acetoprole, ethiprole, fipronil, pyrafluprole, pyriprole, tebufenpyrad, tolfenpyrad and vaniliprole; pyrethroid ester insecticides, such as acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltannethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, metofluthrin, permethrin, biopermethrin, transpermethrin, phenothrin, prallethrin, profluthrin, pyresmethrin, resmethrin, bioresmethrin, cismethrin, tefluthrin, terallethrin, tetramethrin, tralomethrin and transfluthrin; pyrethroid ether insecticides, such as etofenprox, flufenprox, halfenprox, protrifenbute and silafluofen; pyrimidinamine insecticides, such as flufenerim and pyrimidifen; pyrrole insecticides, such as chlorfenapyr; tetronic acid insecticides, such as spirodiclofen, spiromesifen and spirotetramat; thiourea insecticides such as diafenthiuron; urea insecticides, such as flucofuron and sulcofuron; and unclassified insecticides, such as AKD-3088, closantel, crotamiton, cyflumetofen, EXD, fenazaflor, fenazaquin, fenoxacrim, fenpyroximate, FKI-1033, flubendiamide, cyazypyr (cyantraniliprole), hydramethylnon, IKI-2002, isoprothiolane, malonoben, metaflumizone, metoxadiazone, nifluridide, NNI-9850, NNI-0101 (pyrifluquinazon), pymetrozine, pyridaben, pyridalyl, Qcide, rafoxanide, rynaxypyr (chlorantraniliprole), SYJ-159, sulfoxaflor, triarathene, and triazamate, and any combinations thereof.

Generally, the liquid dressing compositions described herein may also comprise any adjuvants, excipients, or other desirable components known in the art. For example, in some embodiments, the treatment composition further comprises a surfactant.

In these compositions, the active ingredient is employed in pure form, a solid active ingredient for example in a specific particle size, or, preferably, together with-at least one of the auxiliaries conventionally used in the art of formulation, such as extenders, for example solvents or solid carriers, or such as surface-active compounds (surfactants). Examples of suitable solvents or diluents are water, unhydrogenated or partially hydrogenated aromatic hydrocarbons, preferably the fractions $C_5$ to $C_{12}$ of alkylbenzenes, such as xylene mixtures, alkylated naphthalenes or tetrahydronaphthalene, aliphatic or cycloaliphatic hydrocarbons, such as paraffins or cyclohexane, alcohols such as ethanol, propanol or butanol, glycols and their ethers and esters such as propylene glycol, dipropylene glycol ether, ethylene glycol or ethylene glycol monomethyl ether or ethylene glycol monoethyl ether, ketones, such as cyclohexanone, isophorone or diacetone alcohol, strongly polar solvents, such as N-methylpyrrolid-2-one, dimethyl sulfoxide or N,N-dimethylformamide, water, unepoxidized or epoxidized vegetable oils, such as unexpodized or epoxidized rapeseed, castor, coconut or soya oil, and silicone oils.

Suitable surface-active compounds are, depending on the type of the active ingredient to be formulated, non-ionic, cationic and/or anionic surfactants or surfactant mixtures which have good emulsifying, dispersing and wetting properties. The surfactants mentioned below are only to be considered as examples; a large number of further surfactants which are conventionally used in the art of formulation and suitable according to the invention are described in the relevant literature.

Suitable non-ionic surfactants are, especially, polyglycol ether derivatives of aliphatic or cycloaliphatic alcohols, of saturated or unsaturated fatty acids or of alkyl phenols which may contain approximately 3 to approximately 30 glycol ether groups and approximately 8 to approximately 20 carbon atoms in the (cyclo)aliphatic hydrocarbon radical or approximately 6 to approximately 18 carbon atoms in the alkyl moiety of the alkyl phenols. Also suitable are water-soluble polyethylene oxide adducts with polypropylene glycol, ethylenediaminopolypropylene glycol or alkyl polypropylene glycol having 1 to approximately 10 carbon atoms in the alkyl chain and approximately 20 to approximately 250 ethylene glycol ether groups and approximately 10 to approximately 100 propylene glycol ether groups.

Normally, the abovementioned compounds contain 1 to approximately 5 ethylene glycol units per propylene glycol unit. Examples which may be mentioned are nonylphenoxy-polyethoxyethanol, castor oil polyglycol ether, polypropylene glycol/polyethylene oxide adducts, tributylphenoxy-polyethoxyethanol, polyethylene glycol or octylphenoxypolyethoxyethanol. Also suitable are fatty acid esters of polyoxyethylene sorbitan, such as polyoxyethylene sorbitan trioleate. The cationic surfactants are, especially, quarternary ammonium salts which generally have at least one alkyl radical of from $C_8$ to $C_{22}$ carbon atoms as substituents and as further substituents (unhalogenated or halogenated) lower alkyl or hydroxyalkyl or benzyl radicals. The salts are preferably in the form of halides, methylsulfates or ethylsulfates. Examples are stearyltrimethylammonium chloride and benzylbis(2-chloroethyl)ethylammonium bromide.

Examples of suitable anionic surfactants are water-soluble soaps or water-soluble synthetic surface-active compounds. Examples of suitable soaps are the alkali, alkaline earth or (unsubstituted or substituted) ammonium salts of fatty acids having approximately $C_{10}$ to $C_{22}$ carbon atoms as substituents, such as the sodium or potassium salts of oleic or stearic acid, or of natural fatty acid mixtures which are obtainable for example from coconut or tall oil; mention must also be made of the fatty acid methyl taurates. However, synthetic surfactants are used more frequently, in particular fatty sulfonates, fatty sulfates, sulfonated benzimidazole derivatives or alkylaryl sulfonates. As a rule, the fatty sulfonates and fatty sulfates are present as alkali, alkaline earth or (substituted or unsubstituted) ammonium salts and they generally have an alkyl radical of $C_8$ to $C_{22}$ carbon atoms as substituents, alkyl also to be understood as including the alkyl moiety of acyl radicals; examples which may be mentioned are the sodium or calcium salts of lignosulfonic acid, of the dodecylsulfuric ester or of a fatty alcohol sulfate mixture prepared from natural fatty acids. This group also includes the salts of the sulfuric esters and sulfonic acids of fatty alcohol/ethylene oxide adducts. The sulfonated benzimidazole derivatives preferably contain 2 sulfonyl groups and a fatty acid radical of approximately 8 to approximately 2 2 C atoms. Examples of alkylarylsulfonates are the sodium, calcium or triethanolammonium salts of decylbenzenesulfonic acid, of dibutylnaphthalenesulfonic acid or of a naphthalenesulfonic acid/formaldehyde condensate. Also possible are, furthermore, suitable phosphates, such as salts of the phosphoric ester of a p-nonylphenol/(4-14)ethylene oxide adduct, or phospholipids.

As a rule, the dressing compositions may comprise 0.1 to 99%, especially 0.1 to 95%, of active ingredient and 1 to 99.9%, especially 5 to 99.9%, of at least one solid or liquid adjuvant, it being possible as a rule for 0 to 25%, especially 0.1 to 20%, of the composition to be surfactants(% in each case meaning percent by weight).

Whereas concentrated compositions, also referred to as pre-mix formulations tend to be preferred for cartridge use, also dilute compositions which have substantially lower concentrations of active ingredient may be employed as ready-to-use, or so-called tank mix compounds.

Suitable pre-mix formulations for seed application may comprise 0.1 to 99.9%, especially 1 to 95%, of the desired ingredients, and 99.9 to 0.1%, especially 99 to 5%, of a solid or liquid adjuvant or diluent, including, for example, a solvent or diluent such as water, whereby auxiliary components may include surfactants in an amount of from 0 to 50%, especially 0.5 to 40%, based on the pre-mix formulation. Preferably, a formulation for seed treatment application comprises 0.25 to 80%, especially 1 to 75%, of the desired ingredients, and 99.75 to 20%, especially 99 to 25%, of a solid or liquid auxiliary compounds, including, for example, a diluent such as water, with auxiliary compounds such as surfactants in an amount of from 0 to 40%, especially 0.5 to 30%, based on the tank-mix formulation. Advantageously, a pre-mix formulation for seed treatment application may comprises 0.5 to 99.9%, especially 1 to 95%, of the desired ingredients, and 99.5 to 0.1%, especially 99 to 5%, of a solid or liquid adjuvant, including, for example, a diluents such as water, whereby the auxiliary compounds such as surfactants in an amount of 0 to 50%, especially 0.5 to 40%, based on the pre-mix formulation. In general, the pre-mix compositions used in the subject process may contain 0.5 to 99.9 especially 1 to 95, advantageously 1 to 50%, by mass of the desired ingredients, and 99.5 to 0.1, especially 99 to 5%, by mass of a solid or liquid adjuvant, including, for example, a solvent or diluent such as water, and auxiliary compounds such as surfactants in an amount of from 0 to 50, especially of from 0.5 to 40%, by mass based on the mass of the pre-mix formulation. Preferably, the composition may comprise 0.1 to 99%, especially 0.1 to 95%, of active ingredient and 1 to 99.9%, especially 5 to 99.9%, of at least one solid or liquid adjuvant, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

A formulation for seed treatment application at the nozzle comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation as present in a cartridge for seed treatment application may comprise 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Examples of anionic surfactants include alkyl sulfates, alcohol sulfates, alcohol ether sulfates, alpha olefin sulfonates, alkylaryl ether sulfates, arylsulfonates, alkylsulfonates, alkylaryl sulfonates, sulfosuccinates, mono- or diphosphate esters of polyalkoxylated alkyl alcohols or alkyl phenols, mono- or disulfosuccinate esters of alcohols or polyalkoxylated alkanols, alcohol ether carboxylates, phenol ether carboxylates. In one embodiment, the surfactant is an alkylaryl sulfonate.

Examples of non-ionic surfactants include sorbitan esters, ethoxylated sorbitan esters, alkoxylated alkylphenols, alkoxylated alcohols, block copolymer ethers, and lanolin derivatives. In accordance with one embodiment, the surfactant comprises an alkylether block copolymer.

Non-limiting examples of cationic surfactants include mono alkyl quaternary amine, fatty acid amide surfactants, amidoamine, imidazoline, and polymeric cationic surfactants.

In some embodiments, the treatment composition comprises a co-solvent in addition to diluent such as water.

Non-limiting examples of co-solvents that can be used include ethyl lactate, methyl soyate/ethyl lactate co-solvent blends (e.g., STEPOSOL, available from Stepan), isopropanol, acetone, 1,2-propanediol, n-alkylpyrrolidones (e.g., the AGSOLEX series, available from ISP), a petroleum based-oil (e.g., AROMATIC series and SOLVESSO series available from Exxon Mobil), isoparaffinic fluids (e.g. ISOPAR series, available from Exxon Mobil), cycloparaffinic fluids (e.g. NAPPAR 6, available from Exxon Mobil), mineral spirits (e.g. VARSOL series available from Exxon Mobil), and mineral oils (e.g., paraffin oil).

The liquid seed treatment composition may also be in the form of an aqueous slurry comprising one or more dispersed solid phases and a continuous aqueous phase. In some instances, the liquid seed treatment composition further comprises a dispersed liquid organic phase. For example, the composition may be in the form of an aqueous suspension concentrate.

Where the dressing formulation is to be applied to the at least one seed or pant propagation material as an emulsion, the emulsifiable concentrate pre-mix may include the at least one 2,4-(substituted aromatic)-1,3-oxazoline compound, and at least one liquid carrier. The at least one 2,4-(substituted aromatic)-1,3-oxazoline compound may be substantially dissolved in the at least one liquid carrier. The emulsifiable concentrate may, optionally, include at least one emulsifier at a concentration within a range of from about 1 percent by weight to about 30 percent by weight. As used herein, the term "emulsifier" means and includes a material that stabilizes a suspension of droplets of one liquid phase in another liquid phase. The at least one emulsifier may be non-ionic, anionic, cationic, or a combination thereof. Non-limiting examples of non-ionic emulsifiers include polyalkylene glycol ethers and condensation products of alkyl and aryl phenols, aliphatic alcohols, aliphatic amines or fatty acids with ethylene oxide, propylene oxides such as the ethoxylated alkyl phenols, and carboxylic esters solubilized with the polyol or polyoxyalkylene. Non-limiting examples of anionic emulsifiers include oil-soluble salts (e.g., calcium) of alkylaryl sulphonic acids, oil-soluble salts, sulfated polyglycol ethers, and salts of phosphated polyglycol ether. Non-limiting examples of cationic emulsifiers include quaternary ammonium compounds, and fatty amine salts. The emulsifiable concentrate may also contain other compatible additives, such as plant growth regulators and other biologically active compounds used in agriculture. A concentration of the at least one 2,4-(substituted aromatic)-1,3-oxazoline compound in the emulsifiable concentrate may, for example, be within a range of from about 10 percent by weight to about 50 percent by weight. In one or more embodiments, the emulsifiable concentrate may be diluted with water and oil to form spray mixtures in the form of oil-in-water emulsions.

If, for example, the formulation is applied to the at least one seed as an aqueous suspension, the aqueous suspension may include the at least one 2,4-(substituted aromatic)-1,3-oxazoline compound dispersed in an aqueous liquid carrier (e.g., water). A concentration of the at least one 2,4-(substituted aromatic)-1,3-oxazoline compound in the aqueous suspension may be within a range from about 5 to about 50 weight percent. The aqueous suspension may be prepared by finely grinding the at least one 2,4-(substituted aromatic)-1,3-oxazoline compound, and mixing the at least one 2,4-(substituted aromatic)-1,3-oxazoline compound into the aqueous liquid carrier. The aqueous suspension may, optionally, include at least one surfactant that may aid in the formation and/or the stabilization of the aqueous suspension. Other materials, such as inorganic salts and synthetic or natural gums, may be added to increase one or more of the density and the viscosity of the aqueous suspension.

Non-limiting examples of suitable water-immiscible solvents include aromatic hydrocarbons derived from benzene, such as toluene, xylenes, other alkylated benzenes and the like, and naphthalene derivatives, aliphatic hydrocarbons such as hexane, octane, cyclohexane, and the like, mineral oils from the aliphatic or isoparaffinic series, and mixtures of aromatic and aliphatic hydrocarbons; halogenated aromatic or aliphatic hydrocarbons; vegetable, seed or animal oils such as soybean oil, rape seed oil, olive oil, castor oil, sunflower seed oil, coconut oil, corn oil, cotton seed oil, linseed oil, palm oil, peanut oil, safflower oil, sesame oil, tung oil and the like, and $C_1$-$C_6$ mono-esters derived from vegetable, seed or animal oils; $C_1$-$C_6$ dialkyl amides of $C_6$-$C_{20}$ saturated and unsaturated aliphatic carboxylic acids, such as, N—N-dimethyl alkyl amide; $C_1$-$C_{12}$ esters of aromatic carboxylic acids and dicarboxylic acids and $C_1$-$Cl_2$ esters of aliphatic and cyclo-aliphatic carboxylic acids; $C_4$-$C_{12}$ polyesters of dihydric, trihydric, or other lower polyalcohols such as, propylene glycol dioleate, di-octyl succinate, di-butyl adipate, di-octyl phthalate and the like. The aqueous emulsion may be prepared by emulsifying the at least one 2,4-(substituted aromatic)-1,3-oxazoline compound or a water-immiscible solution thereof into the aqueous liquid carrier. The aqueous emulsion may, optionally, include at least one surfactant that may aid in the formation and/or the stabilization of the aqueous emulsion.

The at least one adjuvant material, may also comprise one or more conventional adjuvants used in the agricultural sciences art including, but not limited to, a wetting agent, a dispersant, a binder, a penetrant, a fertilizer, a growth regulator, a buffer, a dye, a sequestering agent, a drift reduction agent, a compatibility agent, a viscosity regulator, an anti-foam agent, a cleaning agent, a surfactant, an emulsifier, combinations thereof, and the like. Suitable adjuvant materials are well known in the agricultural sciences art (e.g., see "Chemistry and Technology of Agrochemical Formulations" edited by D. A. Knowles, copyright 1998 by Kluwer Academic Publishers; also see "Insecticides in Agriculture and Environment—Retrospects and Prospects" by A. S. Perry, I. Yamamoto, I. Ishaaya, and R. Perry, copyright 1998 by Springer-Verlag). In at least some embodiments, the at least one adjuvant material includes at least one binder (e.g., a polyacrylate, a polymethacrylate, a polybutene, a polyisobutylene, a polyether, a polyethyleneamine, a polyethyleneamide, a polyethyleneimine, a polystyrene, a polyurethane, a polyvinylalcohol, a polyvinylpyrrolidone, polyvinylacetate, copolymers derived from such polymers, and combinations thereof) that may enhance the adhesion of the at least one 2,4-(substituted aromatic)-1,3-oxazoline compound to the at least one seed or plant propgataion material.

The dressing composition may also comprise a binder. The binder (or any of the layers) can be molasses, granulated sugar, alginates, karaya gum, jaguar gum, tragacanth gum, polysaccharide gum, mucilage, gelatin, polyvinyl acetates, polyvinyl acetate copolymers, polyvinyl alcohols, polyvinyl alcohol copolymers, styrene acrylate polymers, styrene butadiene polymers, celluloses (including ethylcelluloses and methylcelluloses, hydroxypropylcelluloses, hydroxymethyl celluloses, hydroxymethylpropyl-celluloses), polyvinylpyrolidones, dextrins, malto-dextrins, polysaccharides, fats, oils, proteins, gum arabics, shellacs, vinylidene chloride, vinylidene chloride copolymers, calcium lignosulfonates, acrylic copolymers, starches, derivatized starches, polyvinylacrylates, zeins, carboxymethylcellulose, chitosan, polyethylene oxide, acrylimide polymers and copolymers, polyhydroxyethyl acrylate, methylacrylimide monomers, alginate, ethylcellulose, polychloroprene, syrups or any combination thereof.

According to an embodiment of the present invention, the dressing composition may comprise a plant biostimulant. Plant biostimulants are usually components other than fertilizers that affect plant growth and/or metabolism upon foliar application or when added to soil. Plant biostimulants generally fall within one of three categories: hormone-containing products, amino acid-containing products and humic acid-containing products. Plant biostimulants are used to treat crops in a commercial setting in view of their ability to, for example, increase growth rates, decrease pest plant growth, increase stress tolerance, increase photosynthetic rate, and increase disease tolerance. Plant biostimulants are generally believed to operate by up-regulating or down-regulating plant hormones, such as Cis-jasmone, Methyl-jasmonate and Jasmonic acid.

Preferred biostimulants include extract of seaweed and fermentation product derived from melasse; extract of seaweed and fermentation product derived from melasse comprising urea, amino acids, potassium and molybdenum and EDTA-chelated manganese, extract of seaweed and fermented plant products, extract of seaweed and fermented plant products comprising phytohormones, vitamins, EDTA-chelated copper, zinc, and iron. Further agricultural compounds may include repellants, such as Peppermint oil, Chilli pepper oils and/or Plant oil extracts of various species.

Other and further objects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

The invention claimed is:

1. A sowing device for discharging and treating plant propagation materials after discharging while falling onto an underlying agricultural surface, the device having a reservoir container (10) for the plant propagation materials, having a separating device (20) which is configured to separate plant propagation materials (K) fed from the reservoir container (10) and to output them individually, and having an application device (30) to apply a dressing composition comprising a substrate bearing at least one agricultural compound onto the separated plant propagation materials (K) from a cartridge assembly comprising one or more cartridges that each are separate from the reservoir container (10) in the sowing device, wherein the application device (30) is configured to apply the dressing composition from the one or more cartridges to the separated plant propagation materials (K) after they leave the separating device (20) while the separated plant propagation materials (K) fall freely on toward the underlying agricultural surface (B) wherein the device and the one or more cartridges are configured to allow repeated removal from the device, and optionally, refilling with the dressing composition and replacing in the device, with minimal operator interaction, wherein the device further comprises a transmitter configured to transmit at least seed data and at least one additional data to a remote computer for data analysis, wherein the transmitter is configured to transmit an order request to the remote computer for the remote computer to prepare and procure another cartridge with suitable agricultural compounds to selectively compose a seed treatment, wherein the at least seed data and at least one additional data comprise information of a proportion of plant propagation materials that have been correctly provided with seed dressing composition, and geolocation data and/or environmental data.

2. The sowing device according to claim 1, further comprising

- a housing having therein a main dispensing unit in fluid connection with a fluid flow control unit capable of producing fluid flow between the dispensing unit and the application device,
- a controller unit operatively connected to the fluid flow unit,
- wherein each cartridge comprises a computer-readable unit, the computer-readable unit comprising at least an electronic data storage unit and an interface unit,
- wherein the dispensing unit comprises an interface unit operatively connected to the controller unit, or substantially integral therewith, which is configured to communicate with and read the information from the data storage unit of the computer-readable unit of the cartridge inserted in the device and to transmit the information to the controller unit, and wherein the interface unit is configured for writing updated and/or new information on the data storage unit of the computer-readable unit of the cartridge, and
- wherein the controller unit is responsive to the information read from the computer-readable unit of the cartridge.

3. The sowing device according to claim 2, wherein the dispensing unit comprises a fluid supply unit in communication with the controller unit, and wherein the controller unit is configured to control the fluid supply unit based on the information stored on the computer-readable unit and retrieved therefrom.

4. The sowing device according to claim 2, wherein the controller unit is configured to modulate the volume and pressure of the fluid supply unit based on the information stored on the computer-readable unit and retrieved therefrom.

5. The sowing device according to claim 2, wherein the interface unit comprises a connector or a radio-frequency transceiver.

6. The sowing device according to claim 1, wherein the one or more cartridges are each connected to a nozzle from a plurality of nozzles, through which the dressing composition can be applied from the cartridge to the plant materials.

7. The sowing device according to claim 1, configured to comprise a plurality of the cartridges that each comprise a different dressing composition.

8. The sowing device according to claim 1, further comprising a diluent reservoir for holding and supplying a diluent composition, and a diluent control unit for controlling the supply of the diluent composition during application.

9. The sowing device according to claim 8, wherein the diluent composition is configured to supply diluent to flush the supply lines, and/or for diluting and/or transporting the agricultural compound to the application device (30).

10. The sowing device according to claim 8, the device comprising at least two cartridge connector units for detachably attaching the cartridges to the device, wherein each cartridge comprises a reservoir configured to hold at least an agricultural compound, wherein a first compound being one of an herbicide, a pesticide, a fungicide, and a second compound being one of the same, or of a different herbicide, a different pesticide and a different fungicide; the device further comprising a mixing controller unit configured to compose a seed dressing composition from the at least first and at least second cartridge and the diluent composition.

11. The sowing device according to claim 10, comprising a processor configured to identify the plant propagation material and at least one additional environmental parameter, and to controllably regulate the amount of the diluent, first compound and/or second compound to be respectively provided to fluid supply lines, and controlling the supply of the formed composition to the application device.

12. The sowing device according to claim 1, wherein the transmission by the transmitter is an automatic wireless transmission, a manually initiated transmission, or a physical wired connection, and wherein the other cartridge is delivered to an address corresponding to a location of the device.

13. A cartridge configured to be detachably attached to the device according to claim 1 in a tamper-proof manner, the cartridge comprising:
 a. a reservoir configured to hold at least a first agricultural compound,
 b. a controllable conduit operatively connected to the reservoir of the cartridge; and
 c. a cartridge controller that controllably regulates the dispensing of a first agricultural compound to conduit when the cartridge is in fluid connection, and controls the dispensing of the first agricultural compound into the fluid supply system and interacts with the device controller unit.

14. A method for applying a dressing composition to a plant propagation material during the planting process, the method comprising (i) providing the plant propagation material, (ii) providing a sowing device according to claim 1, and (iii) selectively applying a dressing composition aliquot to the plant propagation material external to the device while the plant propagation material is falling onto the agricultural surface.

15. A computer-readable storage medium comprising instructions which, when executed by a computer, cause the computer to carry out the steps of the method of claim 14.

* * * * *